US012643988B2

(12) United States Patent
Di Mondo et al.

(10) Patent No.: US 12,643,988 B2
(45) Date of Patent: Jun. 2, 2026

(54) COMPOSITION OF POLYMERS DERIVED THROUGH THE MALEATION OF DEPOLYMERIZED POLYPROPYLENE

(71) Applicant: GreenMantra Recycling Technologies Ltd., Brantford (CA)

(72) Inventors: Domenic Di Mondo, Brampton (CA); Irina Fenton, Burlington (CA)

(73) Assignee: GreenMantra Recycling Technologies Ltd., Brantford (CA)

( * ) Notice: Subject to any disclaimer, the term of this patent is extended or adjusted under 35 U.S.C. 154(b) by 790 days.

(21) Appl. No.: 17/838,191

(22) Filed: Jun. 11, 2022

(65) Prior Publication Data

US 2022/0315726 A1     Oct. 6, 2022

Related U.S. Application Data

(63) Continuation of application No. PCT/CA2020/000141, filed on Dec. 11, 2020.

(60) Provisional application No. 62/946,647, filed on Dec. 11, 2019.

(51) Int. Cl.
| | |
|---|---|
| *C08F 110/06* | (2006.01) |
| *C08F 8/46* | (2006.01) |
| *C08F 8/50* | (2006.01) |
| *C08J 11/10* | (2006.01) |
| *C08L 51/06* | (2006.01) |

(52) U.S. Cl.
CPC ............. *C08J 11/10* (2013.01); *C08F 110/06* (2013.01); *C08F 2810/00* (2013.01); *C08J 2323/12* (2013.01)

(58) Field of Classification Search
CPC .. C08F 110/06; C08F 8/50; C08F 8/46; C08L 51/06
See application file for complete search history.

(56) References Cited

U.S. PATENT DOCUMENTS

| | | | |
|---|---|---|---|
| 2,549,538 | A | 4/1951 | Sparks et al. |
| 2,835,659 | A | 5/1958 | Guillet |
| 3,033,256 | A | 5/1962 | Schrenk |
| 3,143,536 | A | 8/1964 | Guzzetta et al. |
| 3,278,513 | A | 10/1966 | Jahrstorfer et al. |
| 3,332,926 | A | 7/1967 | Baron et al. |

(Continued)

FOREIGN PATENT DOCUMENTS

| | | |
|---|---|---|
| AU | 2017218908 A1 | 8/2018 |
| CA | 2098778 A1 | 12/1993 |

(Continued)

OTHER PUBLICATIONS

International Search Report and Written Opinion dated Apr. 15, 2021, in connection with International Application No. PCT/CA2020/000141.

(Continued)

*Primary Examiner* — Catherine S Branch
(74) *Attorney, Agent, or Firm* — Cook Alex Ltd.

(57) ABSTRACT

Polymers are created via the depolymerization of a polypropylene feedstock. The polymers can be modified/grafted with maleic anhydride. In some embodiments the polypropylene feedstock contains recycled or discarded polypropylene. In some embodiments, the polymers contain olefins within the polymer backbone, and/or a suspension of iron, titanium, and/or zinc.

20 Claims, 9 Drawing Sheets

(56)     References Cited

U.S. PATENT DOCUMENTS

| | | | |
|---|---|---|---|
| 3,345,352 A | 10/1967 | Baron et al. |
| 3,411,179 A | 11/1968 | Gregory et al. |
| 3,424,822 A | 1/1969 | Liston |
| 3,441,628 A | 4/1969 | Raetzsch et al. |
| 3,642,722 A | 2/1972 | Knowles et al. |
| 3,927,693 A | 12/1975 | Johnston |
| 3,962,092 A | 6/1976 | Newman |
| 4,053,141 A | 10/1977 | Gussefeld |
| 4,059,525 A | 11/1977 | Krasnow |
| 4,105,806 A | 8/1978 | Watt |
| 4,127,619 A | 11/1978 | Godfrey |
| 4,136,251 A | 1/1979 | Bice et al. |
| 4,177,177 A | 12/1979 | Vanderhoff et al. |
| 4,178,272 A | 12/1979 | Meyer et al. |
| 4,208,252 A | 6/1980 | Yoshida et al. |
| 4,497,921 A | 2/1985 | Chang et al. |
| 4,525,216 A | 6/1985 | Nakanishi |
| 4,620,032 A | 10/1986 | Doerr |
| 4,642,401 A | 2/1987 | Coenen et al. |
| 4,847,209 A | 7/1989 | Lewis et al. |
| 4,911,952 A | 3/1990 | Doane et al. |
| 5,158,982 A | 10/1992 | Stapp |
| 5,292,862 A | 3/1994 | Miura et al. |
| 5,314,741 A | 5/1994 | Roberts et al. |
| 5,315,055 A | 5/1994 | Butcher et al. |
| 5,354,930 A | 10/1994 | Atkins et al. |
| 5,369,215 A | 11/1994 | Platz |
| 5,386,055 A | 1/1995 | Lee et al. |
| 5,481,052 A | 1/1996 | Hardman et al. |
| 5,502,263 A | 3/1996 | Ponsford et al. |
| 5,608,136 A | 3/1997 | Maezawa et al. |
| 5,656,757 A | 8/1997 | Jenczewski et al. |
| 5,672,794 A | 9/1997 | Northemann |
| 5,728,909 A | 3/1998 | Butcher, Jr. |
| 5,731,483 A | 3/1998 | Stabel et al. |
| 5,821,395 A | 10/1998 | Price et al. |
| 5,830,927 A | 11/1998 | Vanderhoff et al. |
| 5,849,964 A | 12/1998 | Holighaus et al. |
| 5,876,644 A | 3/1999 | Nichols et al. |
| 5,990,206 A | 11/1999 | Tanaka et al. |
| 6,143,940 A | 11/2000 | Miller et al. |
| 6,150,577 A | 11/2000 | Miller et al. |
| 6,172,271 B1 | 1/2001 | Horizoe et al. |
| 6,172,275 B1 | 1/2001 | Tadauchi et al. |
| 6,184,427 B1 | 2/2001 | Klepfer et al. |
| 6,211,331 B1 | 4/2001 | Craig |
| 6,268,046 B1 | 7/2001 | Miller et al. |
| 6,288,296 B1 | 9/2001 | Miller et al. |
| 6,822,126 B2 | 11/2004 | Miller et al. |
| 7,834,226 B2 | 11/2010 | Miller |
| 7,893,307 B2 | 2/2011 | Smith |
| 7,923,506 B2 | 4/2011 | Cohoon et al. |
| 7,951,239 B2 | 5/2011 | Trumbore et al. |
| 8,168,839 B2 | 5/2012 | Niu |
| 8,206,500 B1 | 6/2012 | Mathis et al. |
| 8,609,778 B1 | 12/2013 | Frost et al. |
| 8,664,458 B2 | 3/2014 | Kumar et al. |
| 8,680,167 B2 | 3/2014 | Agarwal et al. |
| 9,090,829 B1 | 7/2015 | McGrevy et al. |
| 9,200,130 B2 | 12/2015 | D'Amato et al. |
| 9,353,476 B2 | 5/2016 | Henriksson et al. |
| 9,598,610 B2 | 3/2017 | Hilsenbeck |
| 9,631,153 B2 | 4/2017 | Unger et al. |
| 9,714,385 B2 | 7/2017 | Khan et al. |
| 10,000,715 B2 | 6/2018 | Kumar et al. |
| 10,308,896 B2 | 6/2019 | Scheibel et al. |
| 10,358,603 B1 | 7/2019 | Pour |
| 10,457,602 B2 | 10/2019 | Davis |
| 10,457,886 B2 | 10/2019 | Kumar et al. |
| 10,472,487 B2 | 11/2019 | Gil et al. |
| 10,519,292 B2 | 12/2019 | Yao et al. |
| 10,597,507 B2 | 3/2020 | Di Mondo et al. |
| 10,723,858 B2 | 7/2020 | Yao et al. |
| 10,870,739 B2 | 12/2020 | Di Mondo |
| 10,907,353 B2 | 2/2021 | LaTorre et al. |
| 11,046,613 B2 | 6/2021 | Davis |
| 11,072,676 B2 | 7/2021 | Di Mondo et al. |
| 11,192,999 B2 | 12/2021 | Yao et al. |
| 11,220,586 B2 | 1/2022 | Yao et al. |
| 11,279,811 B2 | 3/2022 | Di Mondo et al. |
| 11,319,493 B2 | 5/2022 | Daggupati et al. |
| 11,499,110 B2 | 11/2022 | Celik et al. |
| 11,518,865 B2 | 12/2022 | Joshi et al. |
| 11,596,935 B2 | 3/2023 | Delferro et al. |
| 11,613,623 B2 | 3/2023 | Kanattukara et al. |
| 11,780,985 B2 | 10/2023 | Delferro et al. |
| 11,999,920 B2 | 6/2024 | Arnst et al. |
| 12,031,097 B2 | 7/2024 | Vyakaranam et al. |
| 12,152,111 B2 | 11/2024 | Dubois |
| 12,172,935 B2 | 12/2024 | Schweiger et al. |
| 2003/0003554 A1 | 1/2003 | Miller et al. |
| 2003/0032840 A1 | 2/2003 | Sirek et al. |
| 2003/0154885 A1 | 8/2003 | Krendlinger et al. |
| 2003/0195278 A1 | 10/2003 | Forgac et al. |
| 2003/0199718 A1 | 10/2003 | Miller |
| 2003/0215588 A1 | 11/2003 | Yeager et al. |
| 2003/0225213 A1 | 12/2003 | Maehara et al. |
| 2004/0071953 A1 | 4/2004 | Sobieski |
| 2004/0161570 A1 | 8/2004 | Zanchetta et al. |
| 2005/0148487 A1 | 7/2005 | Brownscombe et al. |
| 2005/0176866 A1 | 8/2005 | Krendlinger et al. |
| 2006/0084764 A1 | 4/2006 | Hanna et al. |
| 2006/0135713 A1 | 6/2006 | Leclerc et al. |
| 2007/0117894 A1 | 5/2007 | Bach et al. |
| 2007/0263060 A1 | 11/2007 | Laksin et al. |
| 2008/0207811 A1 | 8/2008 | Brust et al. |
| 2009/0036619 A1 | 2/2009 | Herrmann et al. |
| 2009/0110925 A1 | 4/2009 | Fukuda et al. |
| 2009/0321317 A1 | 12/2009 | Widmer et al. |
| 2010/0227954 A1 | 9/2010 | Naidoo et al. |
| 2010/0233408 A1 | 9/2010 | Zickell et al. |
| 2011/0160356 A1 | 6/2011 | Martin |
| 2011/0195256 A1 | 8/2011 | Morikawa et al. |
| 2011/0196073 A1 | 8/2011 | Fee et al. |
| 2012/0016169 A1 | 1/2012 | Kumar |
| 2012/0108863 A1 | 5/2012 | Tippet et al. |
| 2012/0136107 A1 | 5/2012 | Fu et al. |
| 2012/0165455 A1 | 6/2012 | Vitrano et al. |
| 2012/0296036 A1 | 11/2012 | Allen et al. |
| 2012/0304879 A1 | 12/2012 | Tiessen et al. |
| 2012/0310023 A1 | 12/2012 | Huang et al. |
| 2013/0123396 A1 | 5/2013 | Pochert |
| 2013/0137794 A1 | 5/2013 | Kasper et al. |
| 2013/0137796 A1 | 5/2013 | Kropp |
| 2013/0180431 A1 | 7/2013 | Myszak, Jr. et al. |
| 2013/0303810 A1 | 11/2013 | Handerek |
| 2014/0023870 A1 | 1/2014 | Takamori |
| 2014/0046102 A1 | 2/2014 | D'Amato et al. |
| 2014/0069297 A1 | 3/2014 | Rotz et al. |
| 2014/0107307 A1 | 4/2014 | Frost et al. |
| 2014/0134533 A1 | 5/2014 | Sacripante et al. |
| 2014/0182194 A1 | 7/2014 | Unger et al. |
| 2014/0299017 A1 | 10/2014 | Parvez et al. |
| 2015/0018460 A1 | 1/2015 | Guymon et al. |
| 2015/0105494 A1 | 4/2015 | Naidoo et al. |
| 2015/0105496 A1 | 4/2015 | Naidoo et al. |
| 2015/0203731 A1 | 7/2015 | Herrlich et al. |
| 2015/0210611 A1 | 7/2015 | Tippet et al. |
| 2015/0247096 A1 | 9/2015 | Barger et al. |
| 2015/0322263 A1 | 11/2015 | Hilsenbeck |
| 2015/0361374 A1 | 12/2015 | Kumar et al. |
| 2016/0002508 A1 | 1/2016 | Kanderski et al. |
| 2016/0017148 A1 | 1/2016 | Ruan et al. |
| 2016/0024390 A1 | 1/2016 | Ullom |
| 2016/0040074 A1 | 2/2016 | Methling |
| 2016/0053150 A1 | 2/2016 | Croteau et al. |
| 2017/0015876 A1 | 1/2017 | Schroeyers et al. |
| 2017/0232416 A1 | 8/2017 | Gil et al. |
| 2017/0283525 A1 | 10/2017 | Li et al. |
| 2017/0290945 A1 | 10/2017 | Hanson et al. |
| 2017/0306152 A1 | 10/2017 | Shulga et al. |
| 2018/0127522 A1 | 5/2018 | Land et al. |
| 2018/0208731 A1 | 7/2018 | Vankayala |
| 2018/0312694 A1 | 11/2018 | Naidoo et al. |

(56) References Cited

U.S. PATENT DOCUMENTS

| | | |
|---|---|---|
| 2018/0346683 A1 | 12/2018 | DiMondo et al. |
| 2018/0371325 A1 | 12/2018 | Streiff et al. |
| 2019/0062518 A1 | 2/2019 | Jurek et al. |
| 2019/0119191 A1 | 4/2019 | Streiff et al. |
| 2019/0194375 A1 | 6/2019 | Di Mondo et al. |
| 2019/0249088 A1 | 8/2019 | Pour |
| 2019/0322834 A1 | 10/2019 | Yao et al. |
| 2020/0172779 A1 | 6/2020 | Di Mondo |
| 2020/0392319 A1 | 12/2020 | Di Mondo et al. |
| 2021/0061971 A1 | 3/2021 | Delferro et al. |
| 2021/0087113 A1 | 3/2021 | Di Mondo et al. |
| 2021/0108154 A1 | 4/2021 | Scheibel et al. |
| 2021/0324127 A1 | 10/2021 | Di Mondo et al. |
| 2022/0022528 A1 | 1/2022 | Chen et al. |
| 2022/0025151 A1 | 1/2022 | Di Mondo et al. |
| 2022/0089831 A1 | 3/2022 | Kanattukara et al. |
| 2022/0112352 A1 | 4/2022 | Nagy et al. |
| 2022/0119635 A1 | 4/2022 | Youngstrom et al. |
| 2022/0177705 A1 | 6/2022 | Almey et al. |
| 2022/0340819 A1 | 10/2022 | Gray et al. |
| 2022/0396680 A1 | 12/2022 | Wolters et al. |
| 2023/0313531 A1 | 10/2023 | Balheda et al. |
| 2024/0093033 A1 | 3/2024 | Kanaujia et al. |
| 2024/0327715 A1 | 10/2024 | Brita et al. |

FOREIGN PATENT DOCUMENTS

| | | | |
|---|---|---|---|
| CA | 2162005 A1 | 5/1996 |
| CA | 2202941 A1 | 10/1998 |
| CA | 2805570 A1 | 1/2012 |
| CA | 2812961 A1 | 1/2012 |
| CA | 2822678 A1 | 2/2014 |
| CA | 2883204 A1 | 3/2014 |
| CA | 2898257 A1 | 7/2014 |
| CA | 3129563 A1 | 7/2014 |
| CA | 2885144 A1 | 3/2015 |
| CA | 2890874 A1 | 11/2015 |
| CA | 2822678 C | 5/2017 |
| CA | 2981710 A1 | 4/2018 |
| CA | 3036136 A1 | 4/2018 |
| CH | 646717 A5 | 12/1984 |
| CN | 1120347 A | 4/1996 |
| CN | 1712465 A | 12/2005 |
| CN | 101103066 A | 1/2008 |
| CN | 01205390 A | 6/2008 |
| CN | 01205402 A | 6/2008 |
| CN | 101205390 A | 6/2008 |
| CN | 101205396 A | 6/2008 |
| CN | 101205402 A | 6/2008 |
| CN | 101205407 A | 6/2008 |
| CN | 101434821 B | 5/2009 |
| CN | 101502993 A | 8/2009 |
| CN | 101704932 A | 5/2010 |
| CN | 101787102 A | 7/2010 |
| CN | 101970095 A | 2/2011 |
| CN | 102066525 A | 5/2011 |
| CN | 102205220 A | 10/2011 |
| CN | 102989338 A | 3/2013 |
| CN | 103146267 A | 6/2013 |
| CN | 103429675 A | 12/2013 |
| CN | 103509496 A | 1/2014 |
| CN | 104449090 A | 3/2015 |
| CN | 103168016 A | 4/2015 |
| CN | 104552735 A | 4/2015 |
| CN | 104847921 A | 8/2015 |
| CN | 104877699 A | 9/2015 |
| CN | 104910511 A | 9/2015 |
| CN | 105102519 A | 11/2015 |
| CN | 105143326 A | 12/2015 |
| CN | 105153511 A | 12/2015 |
| CN | 105219406 A | 1/2016 |
| CN | 105315391 A | 2/2016 |
| CN | 106413876 A | 2/2017 |
| CN | 106700975 A | 5/2017 |
| CN | 106753057 A | 5/2017 |
| CN | 107286277 A | 10/2017 |
| CN | 107629565 A | 1/2018 |
| CN | 206983219 U | 2/2018 |
| CN | 108473808 A | 8/2018 |
| CN | 108883551 B | 11/2018 |
| CN | 110105474 A | 8/2019 |
| CN | 111607171 A | 9/2020 |
| CN | 112694552 A | 4/2021 |
| CN | 113185626 A | 7/2021 |
| CN | 112779045 B | 10/2021 |
| CN | 113462175 A | 10/2021 |
| CN | 113621189 A | 11/2021 |
| CN | 113751051 A | 12/2021 |
| CN | 115044219 A | 9/2022 |
| CN | 116102742 A | 5/2023 |
| CN | 116162287 A | 5/2023 |
| DE | 1570194 A1 | 8/1969 |
| DE | 3642273 A1 | 4/1987 |
| DE | 19500425 C1 | 4/1996 |
| DE | 69323125 T2 | 8/1999 |
| DE | 10037229 A1 | 2/2000 |
| DE | 10022666 A1 | 11/2001 |
| DE | 102018214702 A1 | 9/2019 |
| EP | 0577279 A1 | 1/1994 |
| EP | 0717094 A1 | 6/1996 |
| EP | 0577279 B1 | 1/1999 |
| EP | 1707614 A1 | 10/2006 |
| EP | 2161299 A1 | 3/2010 |
| EP | 2283094 B1 | 10/2012 |
| EP | 3519487 | 4/2018 |
| EP | 3519487 A0 | 4/2018 |
| EP | 3397442 A1 | 11/2018 |
| EP | 3414295 A1 | 12/2018 |
| EP | 3441136 A1 | 12/2020 |
| EP | 3867312 A1 | 8/2021 |
| EP | 4206306 A1 | 7/2023 |
| ES | 539973 A0 | 4/1986 |
| GB | 569043 A | 5/1945 |
| GB | 690623 A | 4/1953 |
| GB | 1310260 A | 3/1973 |
| GB | 1563440 A | 3/1980 |
| GB | 2402397 A | 12/2004 |
| IN | 104847921 A | 8/2015 |
| JP | S48000661 A | 1/1973 |
| JP | S51125412 A | 11/1976 |
| JP | S59217777 A | 12/1984 |
| JP | H01150857 A | 6/1989 |
| JP | H03292305 A | 12/1991 |
| JP | H0457887 A | 2/1992 |
| JP | H04100807 A | 4/1992 |
| JP | H0552849 A | 3/1993 |
| JP | H05085964 A | 4/1993 |
| JP | H06179877 A | 6/1994 |
| JP | H08508520 A | 9/1996 |
| JP | 108253601 A | 10/1996 |
| JP | H08253601 A | 10/1996 |
| JP | H10-501563 A | 1/1998 |
| JP | H11302663 A | 11/1999 |
| JP | H122000512209 A | 9/2000 |
| JP | H132001040132 A | 2/2001 |
| JP | H142002167466 A | 6/2002 |
| JP | H142002224652 A | 8/2002 |
| JP | H142002256103 A | 9/2002 |
| JP | 2003252676 A | 9/2003 |
| JP | H152003292594 A | 10/2003 |
| JP | H162004131675 A | 4/2004 |
| JP | H172005170986 A | 6/2005 |
| JP | H172005200573 A | 7/2005 |
| JP | H172005527672 A | 9/2005 |
| JP | H172005298802 A | 10/2005 |
| JP | H182006056957 A | 3/2006 |
| JP | H182006143802 A | 6/2006 |
| JP | H192007169531 A | 7/2007 |
| JP | H192007529574 A | 10/2007 |
| JP | H202008525573 A | 7/2008 |
| JP | H212009173874 A | 8/2009 |
| JP | H232011126995 A | 6/2011 |
| JP | H232011225641 A | 10/2011 |
| JP | H252013539476 A | 10/2013 |

(56)     References Cited

FOREIGN PATENT DOCUMENTS

| | | | |
|---|---|---|---|
| JP | H272015512965 A | 4/2015 | |
| JP | H272015512972 A | 4/2015 | |
| JP | H282016523986 A | 8/2016 | |
| JP | H292017513964 A | 6/2017 | |
| JP | H302018203877 A | 12/2018 | |
| JP | R12019508524 A | 3/2019 | |
| JP | R52023500539 A | 1/2023 | |
| KR | 100680677 B1 | 2/2007 | |
| KR | 100899029 B1 | 5/2009 | |
| KR | 100949381 B1 | 3/2010 | |
| KR | 20110051520 A | 5/2011 | |
| KR | 101487772 B1 | 1/2015 | |
| RO | 131874 A2 | 5/2017 | |
| WO | WO 1989000419 A1 | 1/1989 | |
| WO | WO-9506684 A1 * | 3/1995 | ......... B29B 17/0026 |
| WO | 9533790 | 12/1995 | |
| WO | 2000027942 A1 | 5/2000 | |
| WO | 2002090403 A1 | 11/2002 | |
| WO | 2005092963 A1 | 10/2005 | |
| WO | 2006071214 A1 | 7/2006 | |
| WO | 2010023173 A1 | 3/2010 | |
| WO | 2010081054 A1 | 7/2010 | |
| WO | 2010099963 A1 | 9/2010 | |
| WO | 2012007833 A2 | 1/2012 | |
| WO | 2014110644 A1 | 7/2014 | |
| WO | 2014161767 A2 | 10/2014 | |
| WO | 2015130545 A1 | 9/2015 | |
| WO | 2015164017 A1 | 10/2015 | |
| WO | 2015164331 A1 | 10/2015 | |
| WO | 2017113020 A1 | 7/2017 | |
| WO | 2017136957 A1 | 8/2017 | |
| WO | 2017139333 A1 | 8/2017 | |
| WO | 2017161463 A1 | 9/2017 | |
| WO | 2017167947 A1 | 10/2017 | |
| WO | 2018058257 A1 | 4/2018 | |
| WO | 2018158285 A1 | 9/2018 | |
| WO | 2019041049 A1 | 3/2019 | |
| WO | 2019104430 A1 | 6/2019 | |
| WO | 2019195915 A1 | 10/2019 | |
| WO | 2019227233 A1 | 12/2019 | |
| WO | 2019227234 A1 | 12/2019 | |
| WO | 2020118453 A1 | 6/2020 | |
| WO | 2020198871 A1 | 10/2020 | |
| WO | 2021035351 A1 | 3/2021 | |
| WO | 2021048187 A1 | 3/2021 | |
| WO | 2021113951 A1 | 6/2021 | |
| WO | 2022015971 A1 | 1/2022 | |
| WO | 2022074462 A1 | 4/2022 | |
| WO | 2022167903 A1 | 8/2022 | |
| WO | 2023059623 A1 | 4/2023 | |
| WO | 2023088861 A1 | 5/2023 | |
| WO | 2023121379 A1 | 6/2023 | |
| WO | 2023141665 A1 | 7/2023 | |

OTHER PUBLICATIONS

Canadian Office Action dated Apr. 20, 2021, issued in connection with Canadian App. No. 3096804.

Extended European Search Report dated May 3, 2021, issued in connection with EP. App. No. 18851118.2.

Office Action dated on Jun. 3, 2021, in connection with Chinese Application No. 201780059004.9.

International Preliminary Report on Patentability dated Jun. 8, 2021, in connection with International Application No. PCT/CA2019/051814.

Office Action issued on Jul. 5, 2021, in connection with Brazilian App. No. 11 2018 016499 2.

Office Action dated Jul. 6, 2021, issued in connection with JP App. No. 2019-517089.

Office Action issued on Jul. 29, 2021, in connection with Brazilian App. No. 11 2018 068992 0.

Office Action issued on Aug. 12, 2021, in connection with Brazilian App. No. 11 2019 006300 5.

Office Action issued on Aug. 30, 2021, in connection with Mexican App. No. MX/a/2018/008117.

Examination Report No. 1 issued on Sep. 8, 2021, in connection with Australian application No. 2017218908.

International Preliminary Report on Patentability dated Sep. 28, 2021, in connection with International Application No. PCT/CA2020/050439.

European Office Action dated Oct. 5, 2021, issued in connection with European App. No. 17854306.2.

Notice of Acceptance dated Oct. 20, 2021, for Australian App. No. 2017218908.

European Search Report dated Oct. 20, 2021, issued in connection with European App. No. 18882986.5.

European Search Report dated Nov. 11, 2021, issued in connection with European App. No. 16880228.8.

European Search Report dated Nov. 29, 2021, issued in connection with European App. No. 19810083.6.

Notice of Acceptance dated Jan. 4, 2022, issued in connection with Australian Application No. 2017333737.

Extended European Search Report dated Feb. 16, 2022, issued in connection with European Application No. EP 19811163.5.

Examination Report dated Mar. 1, 2022, issued in connection with European Application No. 17769226.6.

International Preliminary Report on Patentability dated March 1. 2022 in connection with International Application No. PCT/CA2020/051166.

Office Action dated Mar. 1, 2022, issued in connection with Mexican Application No. MX/a/2018/008117.

Office Action dated Mar. 2, 2022, issued in connection with Chinese Application No. 201780018293.8.

Office Action dated Apr. 5, 2022, issued in connection with Japanese Application No. 2019-517089.

Office Action dated May 13, 2022, issued in connection with Brazilian Application No. BR 11 2020 004155 6.

International Preliminary Report on Patentability dated May 17. 2022 in connection with International Application No. PCT/CA2020/000141.

Extended European Search Report dated Jun. 3, 2022, issued in connection with European Application No. 19894673.3.

Office Action dated Jun. 10, 2022, issued in connection with Thai Application No. 1801005835.

Office Action dated Jun. 21, 2022, issued in connection with Chinese Application No. 201780018293.8.

Office Action dated May 23, 2023, issued in connection with Japanese Application No. 2020-566670.

Office Action dated Jul. 6, 2023, issued in connection with Chinese Application No. 201880076385.6.

Xinyuan, "Polymer Materials Processing Principle", China Textiles Press, Jul. 2000, pp. 84-85.

Lijiu, "New Roofing Materials", China Building Materials Industry Press, Oct. 2012, in pp. 30-32.

Changming, "Plastic Application Technology Manual", Mechanical Industry Press, May 2013, pp. 287-288.

Examination Report dated Jan. 22, 2025, issued in connection with European Application No. 18882986.5.

Office Action dated Mar. 6, 2025, issued in connection with Chinese Application No. 201980082937.9.

Simnofske, D. et al. "Benefits of F-T Wax Based Warm Asphalt Mixes for Short-Term Binder Aging and Pavement Durability", Jun. 1, 2016, Proceedings of 6th Eurasphalt & Europbitume Congress.

Office Action published Aug. 15, 2023, issued in connection with Brazilian Application No. BR 11 2020 024507 0.

Office Action dated Aug. 16, 2023, issued in connection with Canadian Application No. 3,013,953.

Extended European Search Report dated Aug. 24, 2023, issued in connection with European Application No. 20858584.4.

Office Action dated Sep. 4, 2023, issued in connection with Chinese Application No. 201980043504.2.

Office Action dated Sep. 13, 2023, issued in connection with Brazilian Application No. BR 11 2021 019925 0.

Office Action dated Sep. 27, 2023, issued in connection with Mexican Application No. MX/a/2018/011492.

(56)                    References Cited

OTHER PUBLICATIONS

Office Action dated Jun. 28, 2024, issued in connection with Chinese Application No. 201980036433.3.

Office Action dated Jun. 29, 2024, issued in connection with Chinese Application No. 201980082937.9.

Office Action dated Sep. 3, 2024, issued in connection with Japanese Application No. 2020-566670.

Tordella et al., "Isomorphic Interactions of Ethylenic Polymers and Paraffin Wax", J. of Polymer Science, vol. 8, 1970, pp. 81-87.

Yu, Peroxide modified polyolefin blends Part 1: Effects on LDPE/PP blends with components with similar initial viscosities, Adv. Polymer Tech., vol. 10(3), 1990, pp. 163-172.

Handbook of Adhesives Technology & Application, Beijing Adhesive Society, Aerospace Press, 1991, pp. 735-736.

Oldshue, "Fluid Mixing Technology", Chem. Industry Press, 1991, p. 279.

Teh, A Review of polyethylene-polypropylene blend and their compatibilization, Adv. Polymer Tech., vol. 13(1), 1994, pp. 1-23.

Murty et al., Thermal Degradation Hydrogenation of Commodity Plastics and Characterization of their Liquefaction Products, Fuel Processing Technology, Oct.-Dec. 1996, vol. 49, Issues 1-3, pp. 75-90.

Ding et al., Thermal and catalytic degradation of high density polyethylene and commingled post-consumer plastic waste, Fuel Processing Technology, Mar. 1997, vol. 51, Issues 1-2, pp. 47-62.

Uddin et al., Catalytic Degradation of Polyethylene and Polypropylene into Liquid Hydrocarbons with Mesoporous Silica, Microporous and Mesoporous Materials, May 1998, vol. 21, Issues 4-6, pp. 557-564.

Buekens et al., Catalytic plastics cracking for recovery of gasoline-range hydrocarbons from municipal plastic wastes, Resources, Conservation and Recycling, Aug. 1998, vol. 23, Issue 3, pp. 163-181.

Kartalis et al., Recycling of post-used PE packaging film using the restabilization technique, Poly. Degrad. and Stab., 2000, vol. 70(2), pp. 189-197.

Luo et al., Catalytic degradation of high density polyethylene and polypropylene into liquid fuel in a power-particle fluidized bed, Polymer Degradation and Stability, online, 2000, vol. 70(1), pp. 97-102.

Predel, "Pyrolysis of mixed polyolefins in a fluidiluidized sed-bed reactor and on a pyro-GCMS to yield aliphatic waxes"; Polymer Degradation and Stability, 2000, vol. 70(3), pp. 373-385.

Takuma, "Production of Aromatic Hydrocarbons by Catalytic Degradation of Polyolefins Over H-Gallosilicate", Ind. Eng. Chem. Res., 2001, pp. 1076-1082.

You et al., Liquid-phase catalytic degradation of polyethylene wax over silica modified zeolite catalysts, Polymer Degradation and Stability, 2001, vol. 265(2), pp. 329-336.

Seo et al., Investigation of Catalytic degradation of HDPE by hydrocarbon group type analysis, Journal of Analytical and Applied Pyrolysis, 2003, vol. 70, Issue 2, pp. 97-102.

Lal et al., Depolymerization of HDPE to wax in the presence of a catalyst formed by homonuclear macrocyclic zirconium complex chemically bonded to alumina support, Journal of Molecular Applied Catalysis A: General, 2006, vol. 303(1), pp. 9-17.

Mpanza et al., "Influence of Different Waxes on the Physical Properties of Linear Low-density Polyethylene", South Africa J. of Chem., vol. 59, 2006, pp. 48-54.

Lai et al., Development of heterogeneous catalyst by ionically bonding macrocyclic Zr—Zr complex to montmorillonite clay for depolymerization of polypropylene, Journal of Molecular Applied Catalysis A: Chemical, 2007, vol. 265(1-2), pp. 15-24.

Rosa et al., Processing and thermal, mechanical and morphological characterization of post-consumer polyolefins/thermoplastic starch blends, J. of Mat. Sci., 2007, 42(2), pp. 551-557.

Urbaniak et al. "Waxes- Products of Thermal Degradation of Waste Plastics-Obtaining, Capabilities, and Application", Archives of Waste Management and Environmental Protection, vol. 6, 2007, pp. 71-78.

Requena et al. "Encapsulation of Leu-Enkephalin in core-shell isobutylcyanoacrylate-thiolated chitosan nanoparticles for oral administration", J. Chilean Chem. Soc., 2008, vol. 53(4), pp. 1677-1681.

Halley et al., "Chemorheology of Polymers—From Fundamental Principles to Reactive Processing", Cambridge University Press, 2009, pp. 1-168.

Garcia et al., Recycling extruded polystyrene by dissolution with suitable solvents, J. of Mat. Cycles and Waste Management, 2009, vol. 11(1), pp. 2-5.

Aboulkas, Thermal degradation behaviors of polyethylene and polypropylene. Part 1: pyroloysis kinetics and mechanisms, Energy Conversion and Management, 2010, vol. 51, pp. 1363-1369.

Shang et al., "Pyrolyzed Wax from Recycled Cross-Linked Polyethylene as Warm Mix Asphalt (WMA) Additive for SBS Modified Asphalt", Construction and Building Materials, vol. 25, 2011, pp. 886-891.

Shang et al., "Pyrolyzed Wax from Recycled Cross-Linked Polyethylene as Warm Mix Asphalt (WMA) Additive for SBS Modified Asphalt", Progress in Rubber, Plastics and Recycling Technology, vol. 27, 2011, pp. 133-144.

Arabiourrutia, "Characterization of the waxes obtained by the pyrolysis of polyolefin plastics in a conical spouted ped reactor"; Journal of Analytical and Applied Pyrolysis, 2012, vol. 94, pp. 230-237.

Xanthos, Recycling of the #5 polymer, Science, 2012, vol. 337, pp. 700-702.

Farahanchi et al., Effects of ultrahigh speed twin screw extrusion on the thermal and mechanical degradation of polystyrene, Polymer Engineering, 2016, vol. 6(7), pp. 743-751.

European Search Report dated Apr. 4, 2011, in connection with European Application No. 10172039.

Extended European Search Report dated Apr. 15, 2011, in connection with European Patent Application No. 10172039.9-2104.

International Search Report and Written Opinion dated Jan. 5, 2012, in connection with International Patent Application No. PCTIB2011001642.

International Preliminary Report on Patentability dated Aug. 1, 2012, in connection with International Application No. PCTIB2011001642.

Tongkao, Practical Technology for Modification of Plastics, China Light Industry Press, Oct. 2012, pp. 44-45 and 49-50.

International Search Report and Written Opinion dated Sep. 20, 2013, in connection with International Application No. PCTCA2013000041.

Office Action dated Apr. 4, 2014, in connection with Chinese Application No. 201180034887.0.

Kaitz et al., "Depolymerizable polymers:preparation, applications, and future outlook", MRS Comm., 2015, vol. 5, pp. 191-204.

"SCRA Spinout Case Study-Recycling Technologies", Sep. 2015, pp. 1-3, Retrieved from the Internet: https://warwick.ac.uk/fac/crossfac/sciencecity/casestudies/recycling-technologies/ [retrieved on Aug. 22, 2019].

Office Action dated on Jun. 16, 2015, in connection with Japanese Application No. 2013-519172.

International Preliminary Report on Patentability dated on Jul. 21, 2015, in connection with International Application PCTCA2013000041.

Office Action dated Oct. 15, 2015, in connection with Malaysian Patent Application No. 2013000128.

Sari et al. "Recycling of Polyolefin Materials", Springer Series on Polymer and Composite Materials, (2016).

Sukorez® SU-90, Kolon Industries (Year: 2016).

Office Action dated on Feb. 29, 2016 in connection with Chinese Application No. 201510126290.9.

"GreenMantra Technologies Introduces Ceranovus Wax Modifiers for Improved Asphalt Roofing Production and Performance", Sep. 12, 2016 pp. 1-3, Retrieved from the Internet:https://www.prnewswire.com/news-releases/greenmantratechnologies-introduces-ceranovus-wax-modifiers-for-improved-asphaltroofing-production-and-performance [retrieved on Nov. 18, 2021].

Office Action dated on Oct. 5, 2016, in connection with Canadian Application No. 2805570.

Office Action dated on Oct. 6, 2016, in connection with Canadian Application No. 2898257.

(56) References Cited

OTHER PUBLICATIONS

Gergo, P. et al. "Rheological Investigation of Rubber Bitumen Containing Various Waxes as Warm Mix Additive" Studia UBB Chemia LXII, 2 Tom II, 2017 p. 247-257.

DiMondo "An Added Benefit (Ceranovus A115 and A125)", Jan. 12, 2017, pp. 1-9, Retrieved from the Internet: [retrieved on Nov. 18, 2021] https://www.professionalroofing.net/Articles/An-added-benefit.

International Search Report and Written Opinion dated on Mar. 17, 2017, in connection with International PCTCA2016051555.

Office Action dated Oct. 24, 2022, issued in connection with Brazilian Application No. BR 11 2020 024525 9.

Examination Report dated Dec. 20, 2022, issued in connection with European Application No. 16 880 228.8.

Office Action dated Jan. 13, 2023, issued in connection with Canadian Application No. 3,129,563.

Office Action dated Feb. 6, 2023, issued in connection with Canadian Application No. 3,009,917.

Extended European Search Report dated Feb. 9, 2023, issued in connection with European Application No. 22179677.4.

International Search Report and Written Opinion dated May 2, 2017, in connection with PCT/CA2017/050172.

International Search Report and Written Opinion dated Jul. 25, 2017, in connection with International Application No. PCT/CA2017/050378.

Office Action dated on Nov. 30, 2017, in connection with Indian Application No. 316/KOLNP/2013.

International Search Report & Written Opinion dated Dec. 15, 2017, in connection with International Application No. PCT/CA2017/051166.

Ferraz et al., "Polystyrene recycling processes by dissolution in ethyl acetate", Journal of Applied Polymer Science, 2018.

"Changing the Story of Waste Plastic (Crowdcube presentation)", Feb. 2018, Retrieved from the Internet: https://hkstartupresources.com/wpcontent/uploads/2018/02/recycling-technologies-ltdbusiness- plan.pdf [retrieved on Aug. 22, 2019].

"GreenMantra Technologies Introduce Ceranovus Polymer Additives at IRE", Feb. 6, 2018, Retrieved from the Internet https://www.roofingcontractor.com/articles/92693-greenmantratechnologies-introduce-ceranovus-polymer-additives-at-ire [retrieved on Nov. 18, 2021].

International Preliminary Report on Patentability dated Jul. 12, 2018, in connection with International Application No. PCT/CA2016/051555.

International Preliminary Report on Patentability dated Aug. 23, 2018, in connection with PCT/CA2017/050172.

International Preliminary Report on Patentability dated Oct. 4, 2018, in connection with International Application No. PCT/CA2017/050378.

International Search Report and Written Opinion dated Nov. 16, 2018, in connection with PCT/CA2018/051058.

International Search Report and Written Opinion dated Feb. 5, 2019, in connection with International application No. PCT/CA2018/051517.

International Preliminary Report on Patentability dated Apr. 11, 2019, in connection with International Application No. PCT/CA2017/051166.

Examination Report No. 1 issued on May 1, 2019, in connection with Australian application No. 2018204945.

International Search Report and Written Opinion dated Jul. 4, 2019, in connection with International Application No. PCT/CA2019/000046.

International Search Report and Written Opinion dated Jul. 12, 2019, in connection with International Application No. PCT/CA2019/050762.

International Search Report and Written Opinion dated Jul. 26, 2019, in connection with International Application No. PCT/CA2019/050761.

Extended European Search Report dated Aug. 23, 2019, issued in connection with EP. App. No. 16880228.8.

Extended European Search Report dated Sep. 4, 2019, issued in connection with EP App. No. 17769226.6.

Notice of Acceptance for Patent Application issued on Sep. 6, 2019, in connection with Australian App. No. 2018204945.

Extended European Search Report dated Oct. 7, 2019, issued in connection with EP. App. No. 17749885.4.

Office Action issued on Jan. 13, 2020, in connection with Brazilian App. No. 11 2013 001058 4.

Canadian Office Action dated Jan. 24, 2020, issued in connection with Canadian App. No. 2898257.

Examination Report No. 1 issued on Feb. 26, 2020, in connection with Australian App. No. 2017239181.

Office Action issued on Feb. 28, 2020, in connection with Brazilian App. No. 11 2018 013600 0.

Office Action dated Mar. 2, 2020, in connection with Chinese Application No. 201680082803.3.

International Preliminary Report on Patentability dated Mar. 3, 2020 in connection with International Application No. PCT/CA2018/051058.

International Search Report and Written Opinion dated Mar. 19, 2020, in connection with International Application No. PCT/CA2019/051814.

Partial European Search Report dated Mar. 20, 2020, in connection with European Application No. 17854306.2.

Office Action dated Apr. 28, 2020, in connection with Canadian Application No. 2898257.

Office Action dated on May 26, 2020, in connection with Japanese Application No. 2018-534826.

International Preliminary Report on Patentability dated Jun. 2, 2020 in connection with International Application No. PCT/CA2018/051517.

International Search Report and Written Opinion dated Jun. 9, 2020, in connection with International Application No. PCT/CA2020/050439.

Office Action dated on Jun. 15, 2020, in connection with Chinese Application No. 201780011193.2.

Extended European Search Report dated Jun. 29, 2020, in connection with European Application No. 17854306.2.

Office Action dated on Jun. 30, 2020, in connection with Japanese Application No. 2018-542700.

Notice of Allowance issued on Jul. 1, 2020, in connection with Brazilian App. No. 11 2013 001058 4.

Notice of Allowance dated Oct. 13, 2020, for Japanese App. No. 2018-534826.

International Preliminary Report on Patentability dated Oct. 13, 2020, in connection with International Application No. PCT/CA2019/000046.

Office Action dated Oct. 22, 2020, in connection with Chinese Application No. 201680082803.3.

Office Action dated on Nov. 24, 2020, in connection with Japanese Application No. 2018-542700.

Canadian Office Action dated Nov. 25, 2020, issued in connection with Canadian App. No. 3096804.

Notice of Acceptance dated Nov. 30, 2020, for Australian App. No. 2017239181.

International Search Report and Written Opinion dated Nov. 30, 2020, in connection with International Application No. PCT/CA2020/051166.

International Preliminary Report on Patentability dated Dec. 12, 2020, in connection with International Application No. PCT/CA2019/050761.

International Preliminary Report on Patentability dated Dec. 12, 2020, in connection with International Application No. PCT/CA2019/050762.

Extended European Search Report dated Dec. 17, 2020, issued in connection with EP. App. No. 16880228.8.

Office Action dated on Feb. 2, 2021, in connection with Chinese Application No. 201780018293.8.

Office Action dated on Feb. 9, 2021, in connection with Chinese Application No. 201780011193.2.

Examination Report No. 1 issued on Mar. 30, 2021, in connection with Australian application No. 2017333737.

(56)            References Cited

OTHER PUBLICATIONS

Office Action dated Sep. 7, 2023, issued in connection with Mexican Application No. MX/a/2018/009808.
Office Action dated Oct. 20, 2023, issued in connection with Brazilian Application No. BR 112020004155-6.
Extended European Search Report dated Nov. 14, 2023, issued in connection with European Application No. 20898302.3.
Office Action dated Dec. 1, 2023, issued in connection with MX/a/2019/003575.
Office Action dated Dec. 12, 2023, issued in connection with Japanese Application No. 2021-533652.
Xing, Yuqing, "Thermoplastic Plastics and Their Composites", Harbin Institute of Technology Press, December 1990.
Office Action dated Dec. 11, 2024, issued in connection with Chinese Application No. 2018800566364.
Office Action dated Dec. 13, 2024, issued in connection with Chinese Application No. 2018800763856.
Office Action dated Jan. 7, 2025, issued in connection with Canadian Application No. 3,121,281.
Extended European Search Report dated Jan. 14, 2025, issued in connection with European Application No. 24167042.1.
Office Action dated Jan. 16, 2025, issued in connection with Mexican Application No. MX/a/2020/005399.
Office Action dated Jan. 16, 2025, issued in connection with European Application No. 232083147.
Office Action dated Jan. 24, 2025, issued in connection with Chinese Application No. 201980036433.3.
Office Action dated Feb. 10, 2025, issued in connection with Canadian Application No. 3,083,380.
Shang et al., "Investigation of Recycled Polyethylene Wax to Lower the Viscosity of SBS Modified Asphalt." Petroleum Asphalt, vol. 24, Issue 1, Feb. 28, 2010, pp. 64-69.
Office Action issued Apr. 16, 2024, issued in connection with Mexican Application No. MX/a/2019/003575.
Office Action dated May 17, 2024, issued in connection with European Application No. 17854306.2.
Office Action dated May 20, 2024, issued in connection with Chinese Application No. 201880076385.6.
Office Action dated Jun. 13, 2024, issued in connection with Chinese Application No. 201880056636.4.
Office Action dated Oct. 1, 2024, issued in connection with Japanese Application No. 2021-533652.
Partial Search Report dated Oct. 16, 2024, issued in connection with European Application No. 24167042.1.
Examiner's Report dated Nov. 12, 2024, issued in connection with Canadian Application No. 3,074,243.
Perez, Ignacio et al., "Use of Lignin Biopolymer From Industrial Waste as Bitumen Extender for Asphalt Mixtures", Journal of Cleaner Production, vol. 220, pp. 87-98, XP085643290, ISSN: 0959-6526, DOI: 10.1016/J.JCEPRO.2019.02.08.
White, "Laboratory Evaluation of Asphalt Containing Recycled Plastic as a Bitumen Extended and Modifier", Oct. 28, 2019, Journal of Traffic and Transportation Engineering, vol. 7, No. 5, retrieved from the internet: https://www.researchgate.net/profile/Greg-White/publication/337210894_Laboratory_Evaluation_of_Asphalt_Containing_Recycled_Plastic_as_a_Bitumen_Extender_and_Modifier.pdf.
Office Action dated Mar. 20, 2023, issued in connection with Canadian Application 3,015,859.
Office Action dated Apr. 25, 2023, issued in connection with Mexican Application No. MX/a/2018/009808.
Examination Report dated May 17, 2023, issued in connection with European Application No. 20858584.4.
Office Action dated May 19, 2023, issued in connection with Mexican Application No. MX/a/2018/011492.
Xing, Yuqing, "Thermoplastic Plastics and Their Composites", Harbin Institute of Technology Press, Dec. 1990.

"SCRA Spinout Case Study—Recycling Technologies", Sep. 2015, pp. 1-3, Retrieved from the Internet: https://warwick.ac.uk/fac/crossfac/sciencecity/casestudies/recycling-tecnologies/ [retrieved on Aug. 22, 2019].
Arabiourrutia, "Characterization of the waxes obtained by the pyrolysis of polyolefin plastics in a conical spouted bed reactor"; Journal of Analytical and Applied Pyrolysis, 2012, vol. 94, pp. 230-237.
International Preliminary Report on Patentability dated on Jul. 21, 2015, in connection with International Application PCTCA201300004.
DiMondo "An Added Benefit (Ceranovus A115 and A125)", Jan. 12, 2017, pp. 1-9, Retrieved from the Internet: https://www.professionalroofing.net/Articles/An-added-benefit [retrieved on Nov. 18, 2021].
"Changing the Story of Waste Plastic (Crowdcube presentation)", Feb. 2018, Retrieved from the Internet: https://hkstartupresources.com/wpcontent/uploads/2018/02/recycling-technologies-ltdbusiness- plan.pdf [retrieved on Aug. 22, 2019].
International Preliminary Report on Patentability dated Dec. 1, 2020, in connection with International Application No. PCT/CA2019/050761.
International Preliminary Report on Patentability dated Dec. 1, 2020, in connection with International Application No. PCT/CA2019/050762.
Office Action dated Jul. 1, 2022, issued in connection with Brazilian Application No. BR 11 2018 068992 0.
Office Action dated Jul. 13, 2022, issued in connection with Brazilian Application No. BR 11 2020 010448 5.
Office Action dated Aug. 23, 2022, issued in connection with Brazilian Application No. BR 11 2020 024507 0.
Office Action dated Sep. 23, 2022, issued in connection with Brazilian Application No. BR 11 2019 006300 5.
Office Action dated Nov. 17, 2022, issued in connection with Canadian Application No. 3,013,953.
Extended European Search Report dated Nov. 21, 2022, issued in connection with European Application No. 20784475.4.
Office Action dated Jan. 16, 2024, issued in connection with Japanese Application No. 2020-566670.
Product data sheet for Ceranovus A from GREENMANTRA Technologies (retrieved on Feb. 12, 2024).
Office Action dated Feb. 6, 2024, issued in connection with Canadian Application No. 3,036,136.
Examination Report dated Mar. 5, 2024, issued in connection with European Application No. 18851118.2.
Extended European Search Report dated Mar. 25, 2024, issued in connection with European Application No. 23208314.7.
Rejection Decision dated Jun. 23, 2025, issued in connection with Chinese Application No. 201880076385.6.
Office Action dated Jun. 30, 2025, issued in connection with Chinese Application No. 201880056636.4.
Examination Report dated Jul. 18, 2025, issued in connection with European Application No. 19811163.5.
Rejection decision dated Aug. 4, 2025, issued in connection with Chinese Application No. 201980082937.9.
Office Action dated Aug. 5, 2025, issued in connection with Mexican Application No. MX/a/2020/005399.
Examiner's Report dated Sep. 4, 2025, issued in connection with Canadian Application No. 3,055,974.
Niosh, "Asphalt Fume Exposures During the Application of Hot Asphalt to Roofs", DHHS (NIOSH) Publication No. 2003-112, Jun. 2003.
Office Action dated Apr. 1, 2025, issued in connection with Japanese Application No. 2021-533652.
Examiner's Report dated May 6, 2025, issued in connection with Canadian Application No. 3,135,868.
Reexamination Notification dated May 16, 2025, issued in connection with Chinese Application No. 201780018293.8.
Examiner's Report dated Jun. 10, 2025, issued in connection with Canadian Application No. 3,229,291.
Examiner's Report dated Jun. 13, 2025, issued in connection with Canadian Application No. 3,101,676.
Office Action dated Oct. 23, 2025, issued in connection with Mexican Application No. MX/a/2021/012142.

(56)          References Cited

OTHER PUBLICATIONS

Examiner's Report dated Oct. 28, 2025, issued in connection with European Application No. 19894673.3.
Rejection decision dated Nov. 12, 2025, issued in connection with Chinese Application No. 201980036433.3.
Reexamination Review Decision dated Nov. 25, 2025, issued in connection with Chinese Application No. 201780018293.8.
Office Action dated Nov. 25, 2025, issued in connection with Japanese Application No. 2025-001990.
Examiner's Report dated Nov. 27, 2025, issued in connection with Canadian Application No. 3,083,380.
Extended European Search Report dated Nov. 27, 2025, issued in connection with European Application No. 25186356.9.
Examiner's Report dated Dec. 29, 2025, issued in connection with Canadian Application No. 3,254,259.
Examination Report dated Jan. 5, 2026, issued in connection with European Application No. 20858584.4.
Examination Report dated Jan. 15, 2026, issued in connection with Canadian Application No. 3,163,119.
Voinova, et al., "Microbial Polymers as a Degradable Carrier for Pesticide Delivery", 2009, vol. 45, No. 4, pp. 384-388.
Kalivoda et al., "Application of Mixtures of Polymeric Carriers for Dissolution Enhancement of Fenofibrate Using Hot-Melt Extrusion", International Journal of Pharmaceutics Vo. 429, Mar. 6, 2012, 58-68.
Kalivoda et al., "Application of Mixtures of Polymeric Carriers for Dissolution Enhancement of Oxeglitazar Using Hot-Melt Extrusion", International Journal of Pharmaceutics vol. 439, Oct. 8, 2012, 145-156.
Lee, et al., "Self Healing Behavior for Crack Closing of Expansive Agent Via Granulation/film Coating Methods", Construction and Building Materialss, vol. 71, Aug. 23, 2014, 188-193.
Decision of Final Rejection dated Jan. 6, 2026, issued in connection with Japanese Application No. 2012-533652.
Rejection decision dated Feb. 4, 2026, issued in connection with Chinese Application No. 201880056636.4.
Office Action dated Mar. 4, 2026, issued in connection with Mexican Application No. MX/a/2020/005399.
Examination Report dated Mar. 13, 2026, issued in connection with Canadian Application No. 3,151,493.
Office Action dated Mar. 19, 2026, issued in connection with Mexican Application Mx/a/2021/012142.

* cited by examiner

COMPOSITION OF POLYMERS DERIVED THROUGH THE MALEATION OF DEPOLYMERIZED POLYPROPYLENE

CROSS-REFERENCE TO RELATED APPLICATION

This application is a continuation of and claims priority benefits from International Application No. PCT/CA2020/000141 filed on Dec. 11, 2020, entitled "Composition of Polymers Derived Through the Maleation of Depolymerized Polypropylene". The '141 application, and the present application, claim priority to U.S. provisional patent application Ser. No. 62/946,647 filed on Dec. 11, 2019, also entitled "Composition of Polymers Derived Through the Maleation of Depolymerized Polypropylene". The '647 and '141 applications are hereby incorporated by reference herein in their entireties.

FIELD OF THE INVENTION

The invention relates to polymers derived through the maleation of depolymerized polypropylene. In some embodiments, the polymers are made, at least in part, from recycled plastic materials. In some embodiments, the polymers are maleated polypropylene waxes.

It is advantageous to use readily available polypropylene waste as the feedstock for conversion into higher value specialty chemicals such as, but not limited to, polymers, macromonomers, and polypropylene waxes. Employing this solid waste to produce useful specialty chemicals addresses growing disposal problems. These products can be used in a variety of industries including, but not limited to, packaging; construction including road pavements, roofing materials, insulation materials, filled or reinforced composite materials, caulks, and sealants; plastic processing; agricultural films; paints; adhesives; automotive; and bookbinding.

SUMMARY OF THE INVENTION

Polymers created via depolymerization of polypropylene feedstocks that are then maleated are disclosed along with methods and processes of forming said polymers.

In some embodiments, the composition includes at least about 1% by weight of a maleated polymer with a molecular weight between 500-45,000 atomic mass units (amu) wherein the polymer was derived from depolymerization of polypropylene plastic feedstock.

In some embodiments, the depolymerization of the polypropylene plastic feedstock is at least partially catalytic. In some embodiments, the depolymerization of the polypropylene plastic feedstock is at least partially thermal.

In some embodiments, the polypropylene feedstock comprises post-consumer derived recycled polypropylene. In some embodiments, the polypropylene feedstock comprises post-industrial derived recycled polypropylene. In some embodiments, the polypropylene feedstock comprises greater than 5% of post-consumer derived recycled polypropylene. In some embodiments, the polypropylene feedstock comprises greater than 25% of post-consumer derived recycled polypropylene.

In some embodiments, the depolymerized polymer includes at least one grafted succinate group.

In some embodiments, the polypropylene feedstock comprises between 5% to 30% of material that is other than polypropylene, based on the total weight of said polypropylene feedstock.

In some embodiments, the maleated polymer comprises greater than 0.25% olefin content on the backbone of the chain.

In some embodiments, the maleated polymer composition comprises greater than 25 ppm of zinc; greater than 50 ppm titanium; and/or greater than 50 ppm iron.

In some embodiments, the maleated polymer has an average molecular weight between 500 amu and 45,000 amu and/or a melt temperature between 130° C. and 170° C.

In some embodiments, the polymer comprises a grafted acid, such as maleic anhydride. In some embodiments, the acid number after grafting or maleation is greater than 1 mg KOH/g.

DETAILED DESCRIPTION OF ILLUSTRATIVE EMBODIMENT(S)

Processes and systems for converting polypropylene material into depolymerized polymers are discussed in U.S. application Ser. No. 15/662,818 which is hereby incorporated by reference. An abbreviated description of treating polypropylene material, such as waste polypropylene material, within a reactor of a system is provided below.

Figure 1:
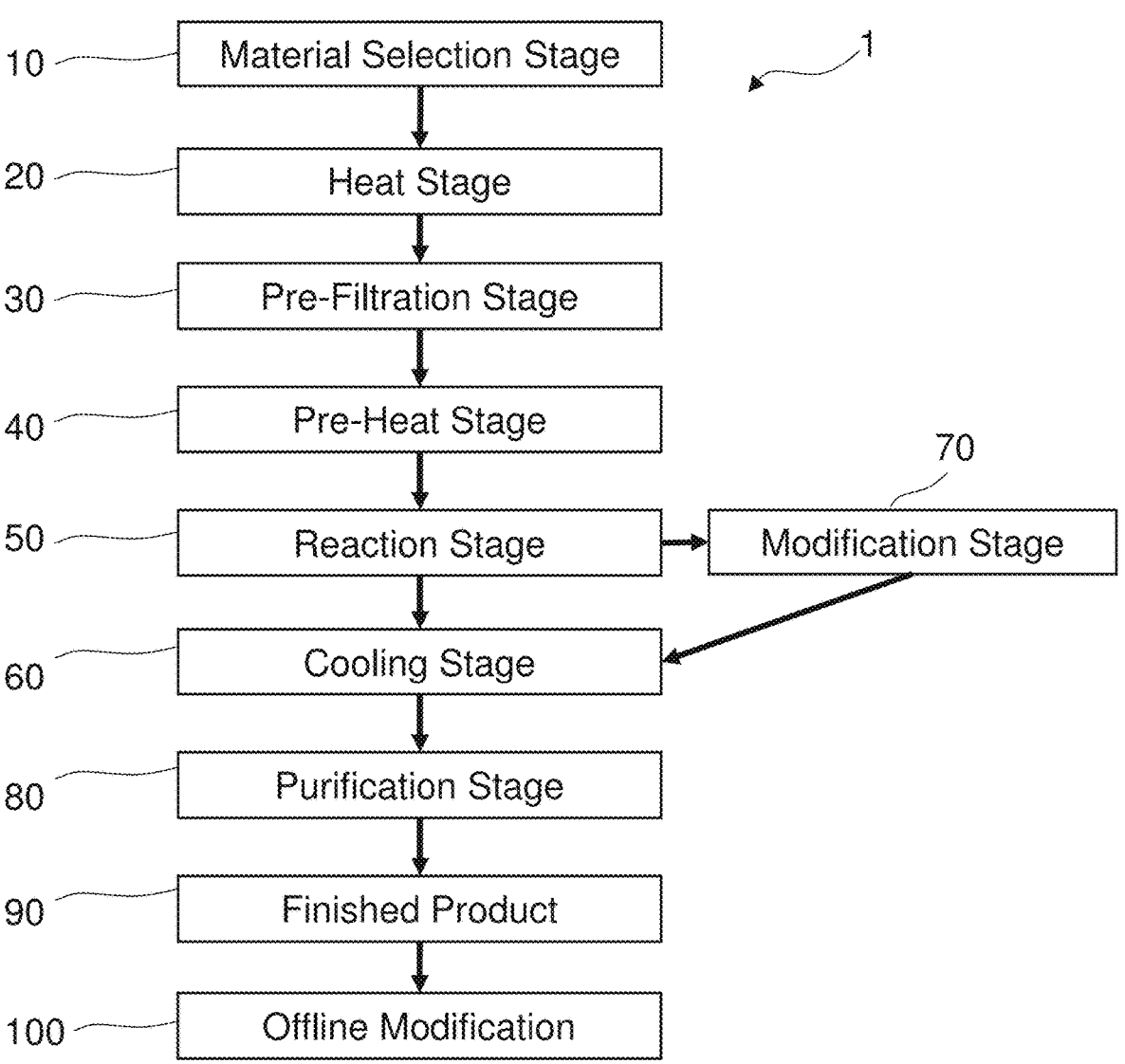
FIG. 1 is a flowchart illustrating a process for treating polypropylene material to create maleated or functional polymers.

FIG. 1 illustrates Process 1 for treating polypropylene material. Process 1 can be run in batches or as a continuous or semicontinuous process. The parameters of Process 1, including but not limited to temperature, reaction or residence time, catalyst loading percent, flow rate of polypropylene, monomers/copolymers grafted during the reaction and/or modification stages, and total number of pre-heat, reaction, and/or cooling segments, can be modified to create end products of varying molecular weights, such as macromonomers, or oligomer polymer products.

For example, raising the temperature and/or decreasing the flow rate through the reaction sections or changing the number of reaction sections will result in the product of a lower molecular weight.

In some embodiments, the end products have varying molecular weights between 500 and 45,000 amu. In some preferred embodiments, the polymers have varying molecular weights between 1,000 and 30,000 amu. In other preferred embodiments, the polymers have varying molecular weights between 1,100 and 10,000 amu.

In Material Selection Stage 10, a feedstock is sorted/selected and/or prepared for treatment. In some embodiments, the feedstock is a polymeric material. In some embodiments, the polymeric material is polypropylene (PP). In other embodiments, the polymeric material includes polypropylene. In some embodiments, lower levels of polystyrene, high density polyethylene (HDPE), low density polyethylene (LDPE), linear low-density polyethylene (LLDPE), and/or other variations of polyethylene including cross-linked polyethylene, polyethylene terephthalate (PET), ethylene-vinyl acetate, polyvinyl chloride (PVC), ethylene vinyl alcohol (EVOH), and undesirable additives and/or contaminants, such as fillers, dyes, metals, various organic and inorganic additives, moisture, food waste, dirt, and/or other contaminating particles can be present in the feedstock. In some embodiments, the polymeric material comprises any one of, or combinations of, post-industrial and/or post-consumer waste polypropylene, recycled polypropylene, and/or virgin polypropylene. In some embodiments, the polypropylene material feed includes primarily virgin granules of polypropylene. The virgin granules can include various molecular weights and melt flows. In some embodiments, the recycled polypropylene is a pellet made from recycled polypropylene.

In some embodiments, the polymeric material is divided evenly by weight between polyethylene and polypropylene.

In some embodiments, the feed can contain up to 30% polyolefins other than polypropylene, PET, EVA, EVOH, and lower levels of undesirable additives or polymers, such as nylon, rubber, PVC, ash, filler, pigments, stabilizers, grit or other unknown particles. In some embodiments, the feed can contain between 5% to 30% polyolefins other than polypropylene, PET, EVA, EVOH, and lower levels of undesirable additives or polymers, such as nylon, rubber, PVC, ash, filler, pigments, stabilizers, grit or other unknown particles. In some embodiments, the feed can contain between 10% to 30% polyolefins other than polypropylene, PET, EVA, EVOH, and lower levels of undesirable additives or polymers, such as nylon, rubber, PVC, ash, filler, pigments, stabilizers, grit or other unknown particles. In some embodiments, the feed can contain between 20% to 30% polyolefins other than polypropylene, PET, EVA, EVOH, and lower levels of undesirable additives or polymers, such as nylon, rubber, PVC, ash, filler, pigments, stabilizers, grit or other unknown particles.

Suitable waste polypropylene material feeds include mixed polypropylene waste such as film, fiber caps, lids, bags, jugs, bottles, pails, and/or other items containing primarily polypropylene. The mixed polypropylene waste can include various melt flows and molecular weights. In some embodiments, the waste polypropylene material feed includes up to 30% of material that is other than polypropylene material, based on the total weight of the waste polypropylene material feed. In some embodiments, the waste polypropylene material feed includes between 5% to 30% material that is other than polypropylene material, based on the total weight of the waste polypropylene material feed. In some embodiments, the waste polypropylene material feed includes between 10% to 30% material that is other than polypropylene material, based on the total weight of the waste polypropylene material feed. In some embodiments, the waste polypropylene material feed includes between 20% to 30% material that is other than polypropylene material, based on the total weight of the waste polypropylene material feed.

In some embodiments, the recycled polypropylene is a pellet made from polypropylene waste such as film, fiber, caps, lids, bags, jugs, bottles, pails, and/or other items containing primarily polypropylene. In some embodiments, the mixed polypropylene waste can include various melt flows and molecular weights.

In some embodiments, the polypropylene feed has an average molecular weight between 100,000 amu and 5,000,000 amu. In some embodiments, the polypropylene feed has an average molecular weight between 500,000 amu and 2,500,000 amu. In some embodiments, the polypropylene feed has an average molecular weight between 750,000 amu and 1,000,000 amu.

In some embodiments, the material selected in Material Selection Stage 10 can be heated in Heat Stage 20 in an extruder and undergoes Pre-Filtration Stage 30. In some embodiments, the extruder is used to increase the temperature and/or pressure of the incoming material and is used to control the flow rates of the material. In some embodiments, the extruder is complimented by or replaced entirely by a pump/heater exchanger combination. In some embodiments, the material enters a molten state.

Pre-Filtration Stage 30 can employ both screen changers and filter beds, along with other filtering techniques/devices to remove contaminants from and purify the heated material. The resulting filtered material is then moved into an optional Pre-Heat Stage 40 which brings the filtered material to a higher temperature before it enters Reaction Stage 50. Pre-Heat Stage 40 can employ, among other devices and techniques, static and/or dynamic mixers and heat exchangers such as internal fins and heat pipes.

Material in Reaction Stage 50 undergoes depolymerization. This depolymerization can be a purely thermal reaction and/or it can employ catalysts. In some embodiments, the depolymerization of a polymeric material is a catalytic process, a thermal process, utilizes free radical initiators, and/or utilizes radiation.

In some embodiments, the catalyst used is a zeolite or alumina supported system or a combination of the two. In some embodiments, the catalyst is [Fe—Cu—Mo—P]/Al$_2$O$_3$. In some embodiments, the catalyst is prepared by binding a ferrous-copper complex to an alumina or zeolite support and reacting it with an acid comprising metals and non-metals to obtain the catalyst material. Other suitable catalyst materials include zeolite, mesoporous silica, H-mordenite and alumina. The system can also be run in the absence of a catalyst and produce lower molecular weight polymers through thermal degradation/depolymerization. In some embodiments, the catalyst is contained in a permeable container.

Depending on the starting material and the desired end product, depolymerization can be used for a slight or extreme reduction of the molecular weight of the starting material.

Reaction Stage 50 can employ a variety of techniques/devices including, among other things, fixed beds, horizontal and/or vertical reactors, and/or static mixers. In some embodiments, Reaction Stage 50 employs multiple reactors and/or reactors divided into multiple sections.

After Reaction Stage 50 the depolymerized material enters optional Modification Stage 70. In some embodiments, Modification Stage is handled in-line. In some embodiments, Modification Stage 70 involves grafting various monomers and/or copolymers such as, but not limited to, acids, alcohols, acetates, maleic anhydride, succinate. and alkenes such as hexene onto the depolymerized product.

In some embodiments, the polymeric product can be a chemically functionalized polypropylene wax such as, but not limited to, a maleated polypropylene wax or succinated polypropylene wax.

Cooling Stage 60 can employ heat exchangers, along with other techniques/devices, such as water jacketed, air cooled, and/or cooled by a refrigerant, to bring the material down to a workable temperature before it enters optional Purification Stage 80.

In some embodiments, cleaning/purification of the material via such methods such as nitrogen stripping occurs before Cooling Stage 60. In some embodiments, purging by nitrogen is used to mitigate oxidation of the molten product material and the creation of explosive conditions.

Optional Purification Stage 80 involves the refinement and/or decontamination of the polymers. Techniques/devices that can be used in Purification Stage 80 include, but are not limited to, flash separation, absorbent beds, clay polishing, distillation, vacuum distillation, nitrogen purging, thin film evaporation, vacuum devolatization, and filtration to remove solvents, oils, color bodies, ash, inorganics, ungrafted monomers and/or coke. In some embodiments, a thin or wiped film evaporator is used to remove gas, oil and/or other low molecular weight molecules from the polymer product. In certain embodiments, the desired product can be isolated via separation or extraction and the solvent can be recycled.

At Finished Product Stage 90 the initial starting material selected in Material Selection Stage 10 has been turned into a polymeric product. In at least some embodiments, the polymeric product does not need additional processing and/or refining. In other embodiments, the polymeric product created at Finished Product Stage 90 can be further modified. In some embodiments, the polymeric product is maleated.

In some embodiments, the depolymerized product is transferred into optional pelletizing or flaking product-forming equipment. In at least some embodiments, the pellets or prills of depolymerized product are between an inclusive range of about 0.1 mm to 5 mm in size. In some preferred embodiments, the pellets are between an inclusive range of about 1 mm to 2 mm in size.

At the optional Off-line Modification Stage 100 the solid depolymerized polymer can be further functionalized. Similar to Modification Stage 70, this stage can involve grafting various monomers and/or copolymers such as, but not limited to, acids, alcohols, acetates, maleic anhydride, succinate. and alkenes such as hexene onto the depolymerized product. In some embodiments the polymers can be further modified to add additional active sites such as carbonyl, ester, carboxylic acids, and/or amines. The active sites can serve functionalization purposes. In some embodiments, to improve compatibility and/or solubility with a system, various monomers and/or copolymers such as, but not limited to, acids, alcohols, acetates, acid anhydride, amines, and alkenes such as hexene, or maleic anhydride can be grafted onto the depolymerized product. In some embodiments, to improve compatibility and/or add function, the various monomers and/or copolymers are grafted on via the olefin fingerprint and/or aromatic functionality.

Grafting can take place, among other places, in the reactor, in line with the stream after cooling, and/or in a separate vessel.

In some embodiments, the polymeric product can be a chemically functionalized polypropylene wax such as, but not limited to, a maleated polypropylene wax or succinated polypropylene wax.

In some embodiments, the maleated polypropylene wax, that is, polypropylene wax grafted with maleic anhydride, can have a viscosity between an inclusive range of about 10 cps-20,000 cps measured at 190° C. (as measured by ASTM D1986), a drop point between an inclusive range of about 130° C.-170° C. (as measured by ASTM D3954), and/or an acid number between an inclusive range of about 1 mg KOH/g-50 mg KOH/g (as measured by ASTM D7389).

In some preferred embodiments, the maleated polypropylene wax has a viscosity between an inclusive range of 50 cps-5,000 cps measured at 190° C. (as measured by ASTM D1986), a drop point between an inclusive range of 140° C.-170° C. (as measured by ASTM D3954), and/or an acid number between an inclusive range of 5 mg KOH/g-35 mg KOH/g (as measured by ASTM D7389).

In other preferred embodiments, the maleated polypropylene wax has a viscosity between an inclusive range of 75 cps-3,500 cps measured at 190° C. (as measured by ASTM D1986), a drop point between an inclusive range of 150° C.-170° C. (as measured by ASTM D3954), and/or an acid number between an inclusive range of 7 mg KOH/g-30 mg KOH/g as (measured by ASTM D7389).

Functionalized polymers derived from depolymerized waste polypropylene polymers, such as polypropylene plastics, have different properties compared to the starting polymer/plastic feedstock and traditional functionalized polypropylene polymers synthesised via fossil sources.

The controlled depolymerization of polypropylene polymers, such as polypropylene plastics, can create polymers with lower molecular weights and greater polarity. The ability to tune the properties of the polymers derived from depolymerized polypropylene polymers, such as polypropylene plastics, allows polymer products to be designed specifically for particular uses.

For example, mid-molecular weight polymers produced via the depolymerization of polypropylene can contain specific structural or chemical properties, including but not limited to, olefin content and/or longer aliphatic sections near terminal positions of the chain. In some embodiments, polymers produced via the depolymerization of polypropylene can contain a specific fingerprint of inorganic elements and carbonyl functional groups.

In some embodiments, the polymers produced via depolarization of polypropylene comprise at least one olefin on the backbone of the chain, typically near a terminal position. In certain embodiments, the olefin content is greater than and inclusive of 0.25% of the total weight of the polymer.

In at least some embodiments, the polymers produced via depolarization of polypropylene are soluble in organic mediums and/or aqueous formulations.

Polymers derived from depolymerized polypropylene can be used where traditional higher molecular weight polypropylene polymers, such as polypropylene plastics, could not be used without modification. Such applications include, but are not limited to, additives for plastic processing (extrusion, injection molding, blow molding, blown and cast films, etc.), additives for asphalt roofing and pavements, and as additives to various adhesives.

In addition, the use of polymers derived from waste polypropylene polymers, such as polypropylene plastics, can help reduce greenhouse gases, landfill waste, and the need to produce new products derived from fossil or virgin polypropylene.

Illustrative Examples

In an illustrative embodiment, several formulations of maleated and unmaleated depolymerized polypropylene were produced. See Table 1.

TABLE 1

| | Formulations | | | | |
|---|---|---|---|---|---|
| | | Formulation | | | |
| | | A | B | C | D |
| Component | Unmaleated depolymerized polypropylene wax | 100% | 0 | 34% | 67% |
| | Maleated depolymerized polypropylene wax | 0 | 100 | 66% | 33% |

The unmaleated depolymerized polypropylene wax (Formulation A) comprises a wax created via the depolymerization of polypropylene waste as described above and in U.S. application Ser. No. 15/662,818. The unmaleated depolymerized polypropylene wax has a density of about 0.90 g/cm³ (ASTM D1298), a viscosity of about 75 cps at 190° C., and a drop point of about 155° C. (ASTM D3954).

Maleated (Formulation B) was prepared by a reactive modification of 88.8 percent by weight of Unmaleated (Formulation A) with 10 percent by weight of maleic anhydride and 1.2 percent by weight of peroxide (Luperox DBHP). Modification was conducted in a ZSK 92MC extruder (twin screw) between 150-175° C., followed by a double cooler belt (pastillator).

Various formulations of maleated depolymerized polypropylene wax can be created by adjusting the ratio of the unmaleated depolymerized polypropylene wax, maleic anhydride, and peroxide. In some embodiments, the amount of unmaleated depolymerized polypropylene wax is between and inclusive of 80 to 95 percent by weight. In some embodiments, the amount of unmaleated depolymerized polypropylene wax is between and inclusive of 85 to 90 percent by weight. In some embodiments, the amount of maleic anhydride is between and inclusive of 4.9 to 19.9 percent by weight. In some embodiments, the amount of maleic anhydride is between and inclusive of 10 to 15 percent by weight. In some embodiments, the amount of peroxide is between and inclusive of 0.1 to 2.5 percent by weight. In some embodiments, the amount of peroxide is between and inclusive of 0.5 to 1 percent by weight.

Formulations C and D were produced by blending Formulation A and Formulation B in the ratios indicated. However, Formulation C and Formulation D could also be produced by a reactive modification of Formulation A with maleic anhydride and peroxide in which the ratios of Formulation A, maleic anhydride and peroxide are adjusted accordingly.

TABLE 2

| Properties of Resulting Polymers | | | | |
|---|---|---|---|---|
| | Formulation | | | |
| | A | B | C | D |
| MW (Weight-average molecular weight) | 5168 | 9133 | 6551 | 6142 |
| MN (Number-average molecular | 2008 | 649 | 1473 | 1311 |

TABLE 2-continued

| Properties of Resulting Polymers | | | | |
|---|---|---|---|---|
| | Formulation | | | |
| | A | B | C | D |
| weight as determined by gel permeation chromatography) | | | | |
| MW/MN | 2.57 | 14.1 | 4.4 | 4.7 |
| Acid Number | 0 | 35 | 20 | 10 |
| AN (Bound) ASTM D7389, mg KOH/g | 0 | 35-37 | 18-22 | 8-12 |
| Drop Point ASTM D3954 ° C. | 155 | 156 | 156 | 155 |
| Viscosity (190 C.) ASTM D1986, cPs | 75 | 330 | 180 | 126 |
| Iron (ppm by XRF) | 756 | 177 | 124 | 140 |
| Titanium (ppm by XRF) | 1721 | 4321 | 2386 | 2892 |
| Zinc (ppm by XRF) | 37 | 54 | 43 | 53 |

Figure 2:
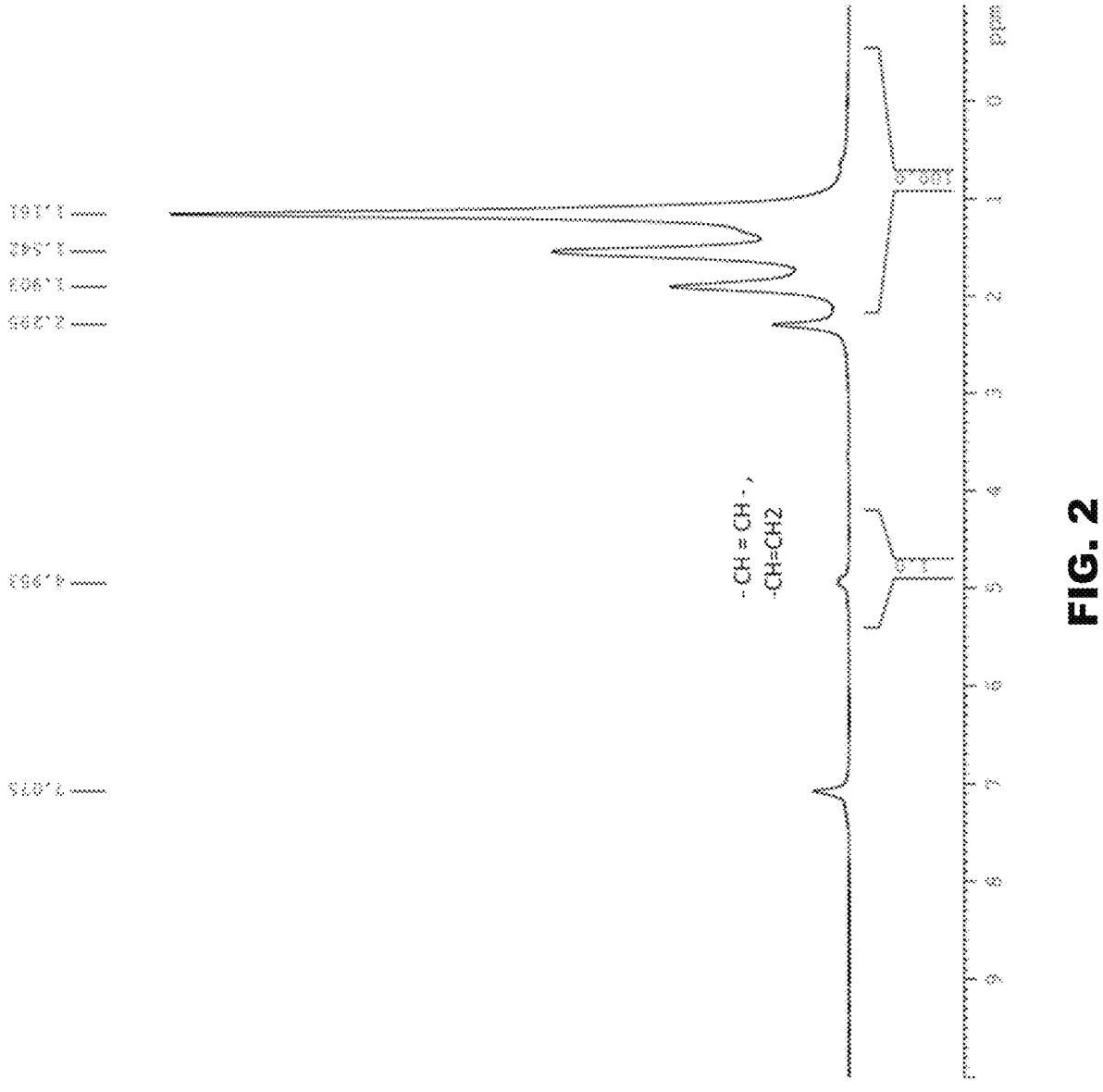
FIG. 2 is a proton nuclear magnetic resonance (H NMR) spectrum for an unmaleated depolymerized polypropylene wax.

FIG. 2 shows a H NMR spectrum of Formulation A. The peaks in the 4.8-5.7 area correspond to unsaturated bonds.

Figure 3:
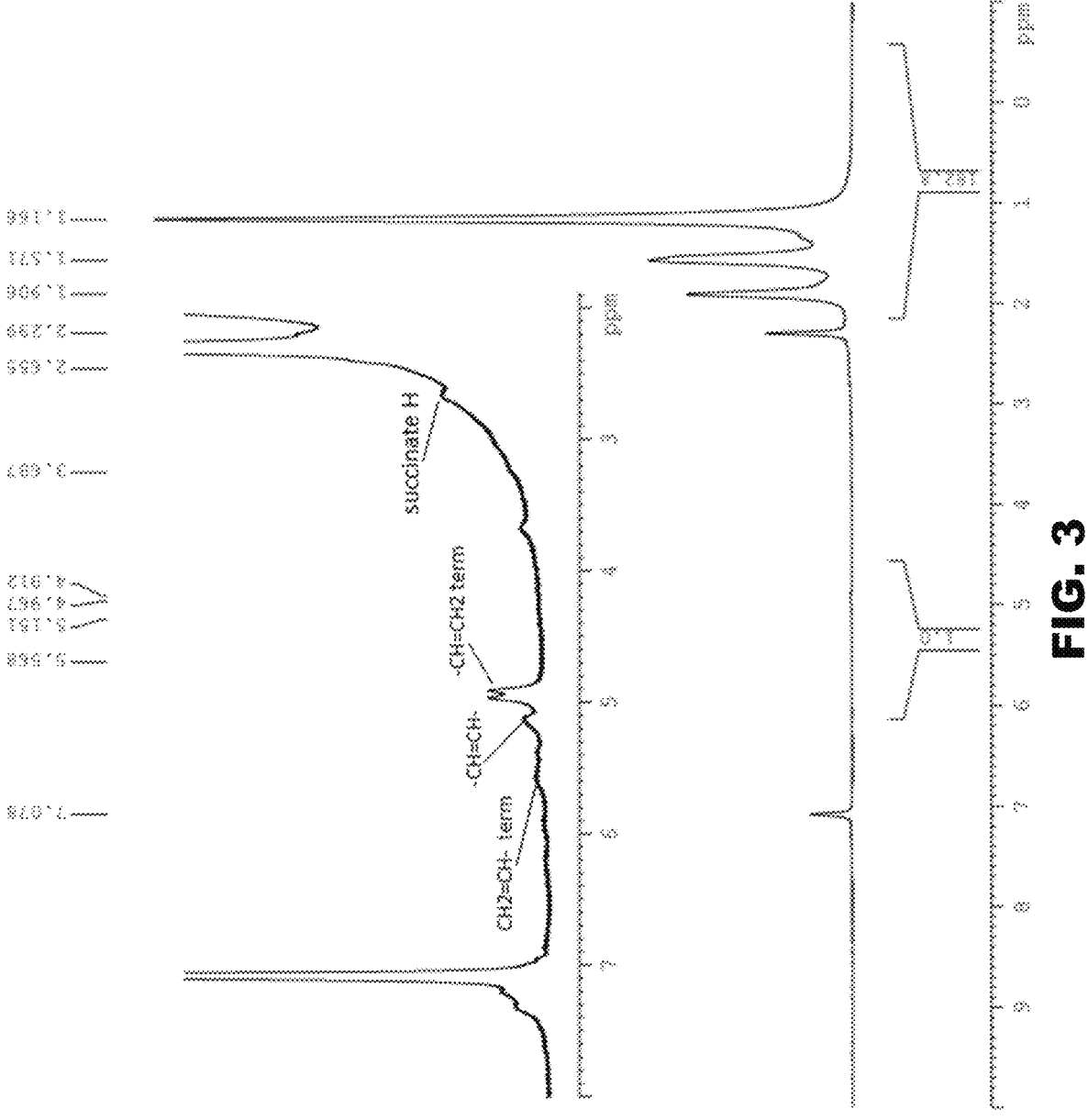
FIG. 3 is a H NMR spectrum for a maleated depolymerized polypropylene wax.

FIG. 3 is a H NMR spectrum for Formulation B. Peaks around 4.8-5.7 demonstrate unsaturated bonds. The peak at 2.6 shows the presence of grafted succinate groups. These additional functional groups allow the resulting material to be more easily incorporated into a broader range of systems due to its high degree of polarity. In addition, the higher degree of polarity in the system due to the addition of malic functional groups can allow the malleated product to compatibilize dissimilar systems, including but not limited to, mixed plastic streams and/or polymer modified asphalt formulations containing styrene-butadiene-styrene (SBS).

Figure 4:
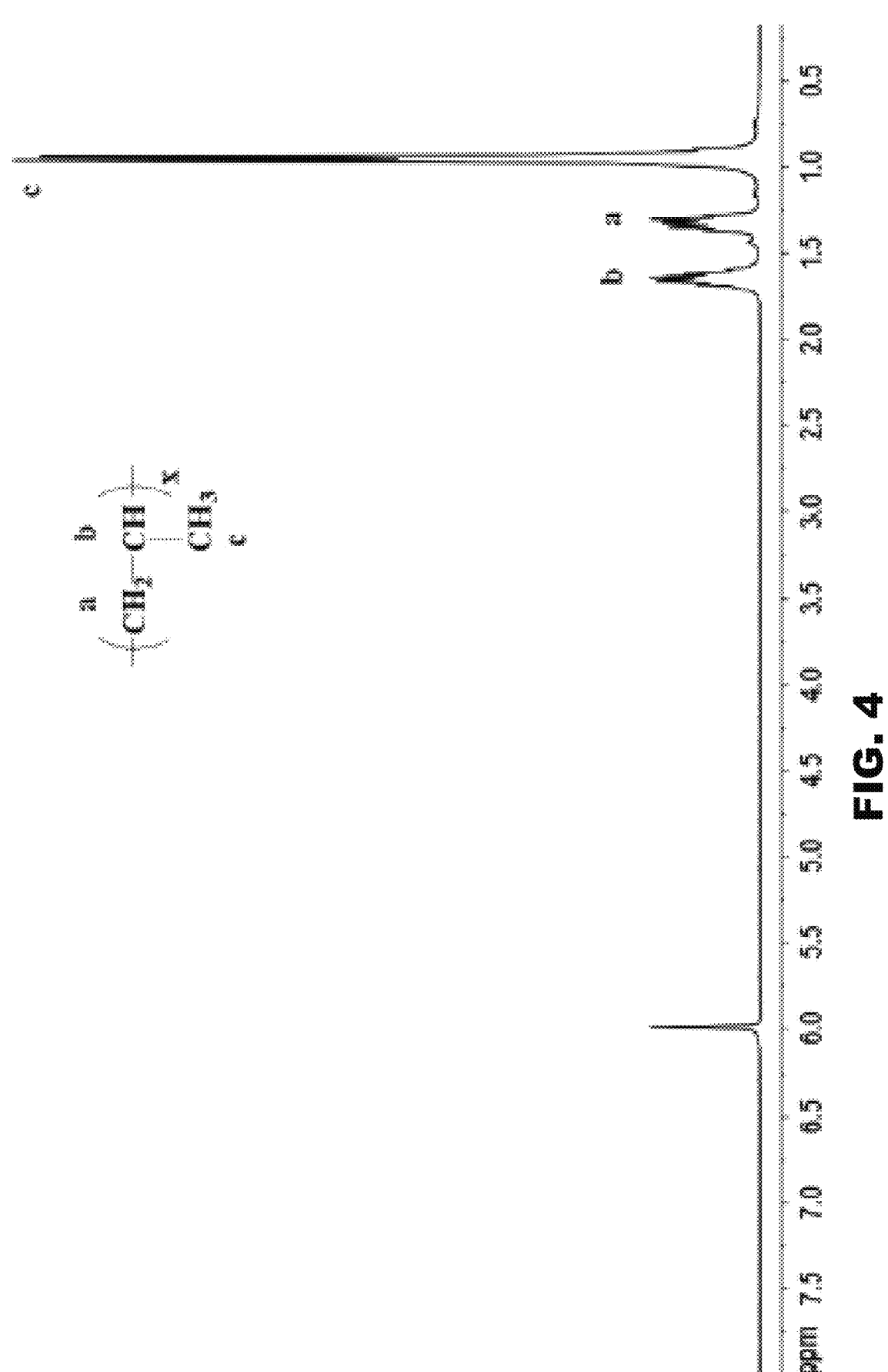
FIG. 4 is a H NMR spectrum for a polypropylene wax derived by polymerization of monomers.

FIG. 4 is a H NMR spectrum for a polypropylene wax derived by polymerization of monomers. The lack of peaks in the 4.8-5.7 area illustrates a lack of unsaturated bonds.

FIG. 2 and FIG. 3 show that the polymers created via depolymerization contain active sites (such as olefin moieties). These active sites are a signature of materials produced via a depolymerization process. Backbone or terminal olefins are identifiable features that are not present in polymers derived through polymerization methods (see FIG. 4).

Figure 8:
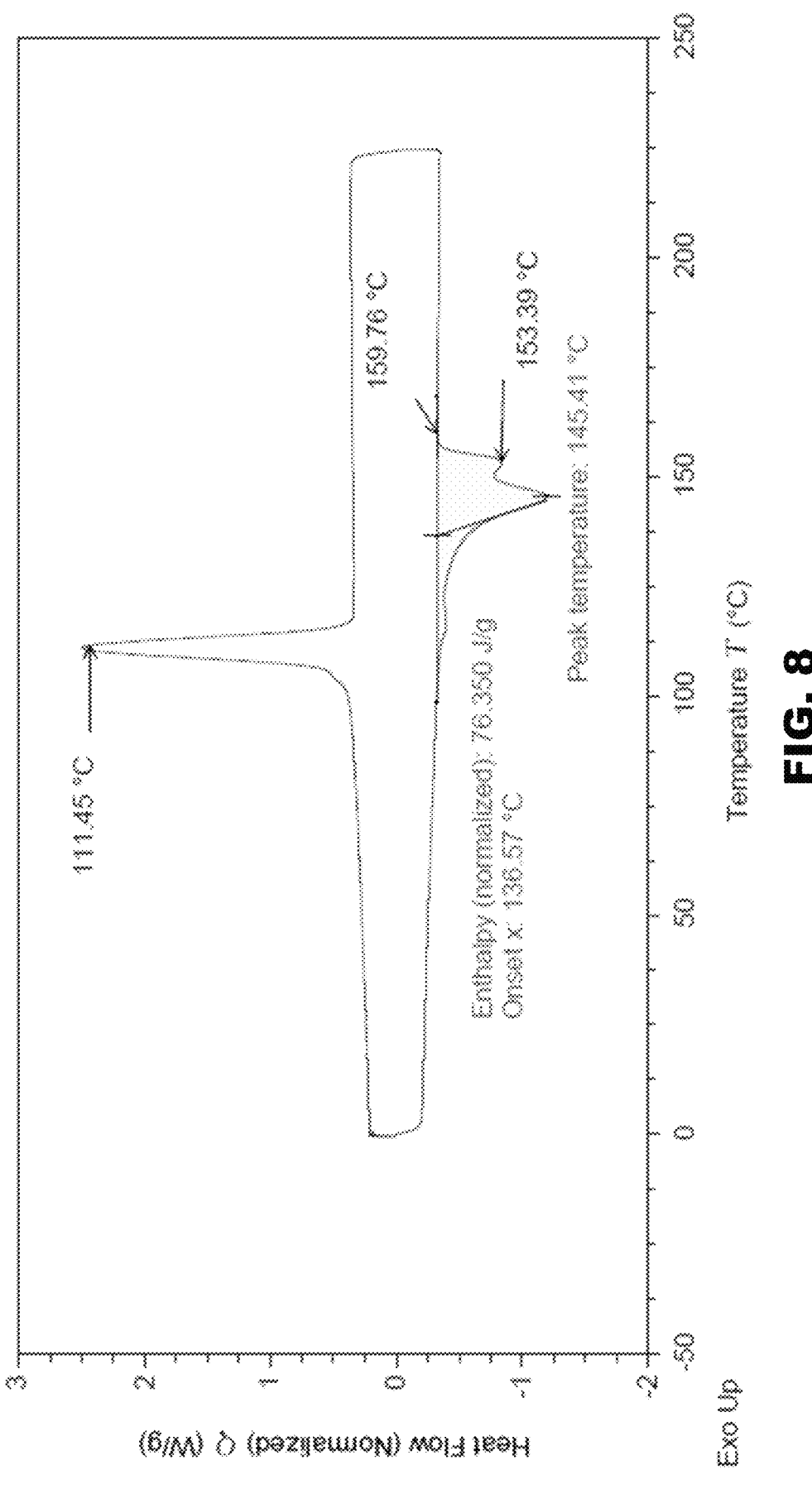
FIG. 8 is a differential scanning calorimetry thermogram for another embodiment of a maleated depolymerized polypropylene wax blended with an unmaleated depolymerized polypropylene wax.

Backbone or terminal olefins, which involve double bonded carbon atoms, are more polar in nature compared to polymers with saturated backbones such as those created via polarization and shown in FIG. 8. This makes polymers with olefin content more compatible in various organic and aqueous solvent formations than traditional polypropylene. In addition, the added olefin content can allow the polymer to act as a site for coupling or crosslinking with other monomers or polymer systems.

As demonstrated via x-ray fluorescence (see Table 2), in at least some embodiments, the resulting compositions include greater than 25 ppm of iron; greater than 25 ppm of zinc; and/or greater than 50 ppm of titanium. The presence of these metals confirms that the polymer was derived through either post-consumer or post-industrial waste polypropylene polymers, such as polypropylene plastics. As the metals are dispersed in the polymers, they add both polarity and reactivity. In at least some embodiments, this can make the polymers more compatible in various organic and aqueous solvent formations than traditional polypropylene. In addition, the added metal content can allow the polymer to act as a coupling agent with other multi-polymer systems. The presence of metals can contribute to nucleating properties of the material when mixed with other polymers.

In at least some embodiments, the presence of titanium contributes to UV-resistance properties. In at least some embodiments, the presence of zinc contributes to thermal stability of the materials.

Figure 5:
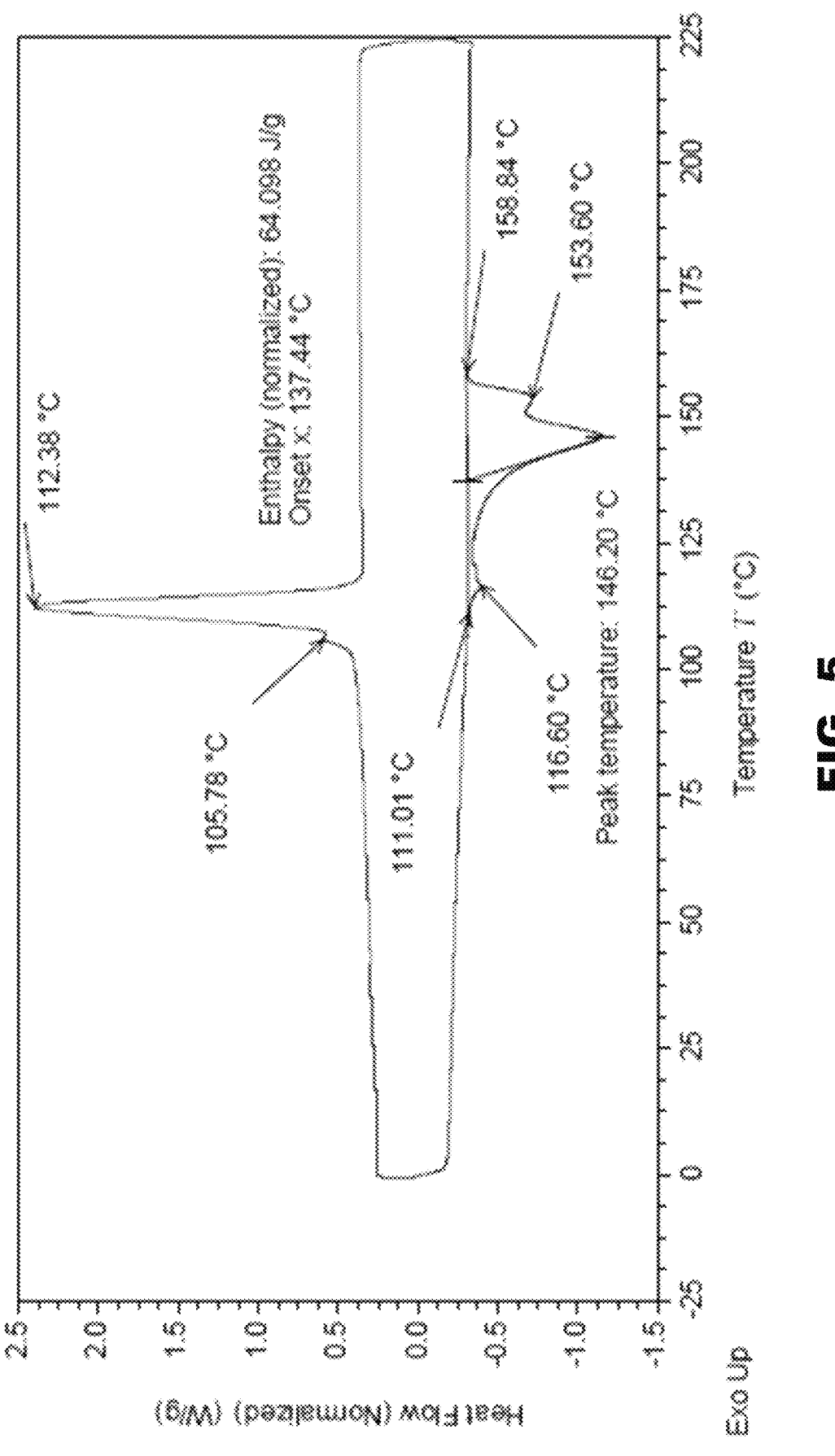
FIG. 5 is a differential scanning calorimetry thermogram for an unmaleated depolymerized polypropylene wax.

FIG. 5 is a differential scanning calorimetry thermogram for Formulation A (determined via ASTM D3418).

Figure 6:
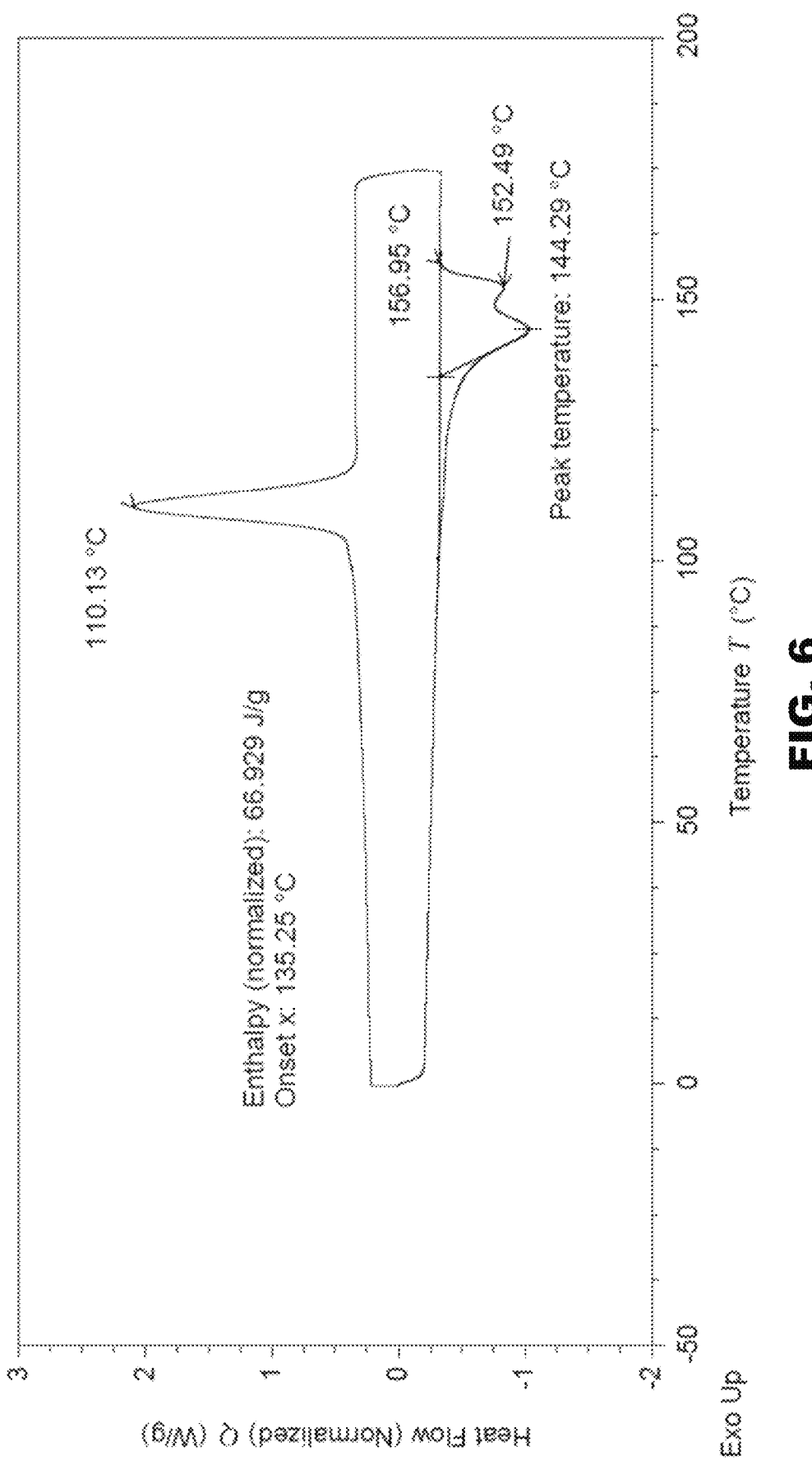
FIG. 6 is a differential scanning calorimetry thermogram for a maleated depolymerized polypropylene wax.

FIG. 6 is a differential scanning calorimetry thermogram for Formulation B (determined via ASTM D3418).

Figure 7:
FIG. 7 is a differential scanning calorimetry thermogram for a maleated depolymerized polypropylene wax blended with an unmaleated depolymerized polypropylene wax.

FIG. 7 is a differential scanning calorimetry thermogram for Formulation C (determined via ASTM D3418).

FIG. 8 is a differential scanning calorimetry thermogram for Formulation D (determined via ASTM D3418).

Figure 9:
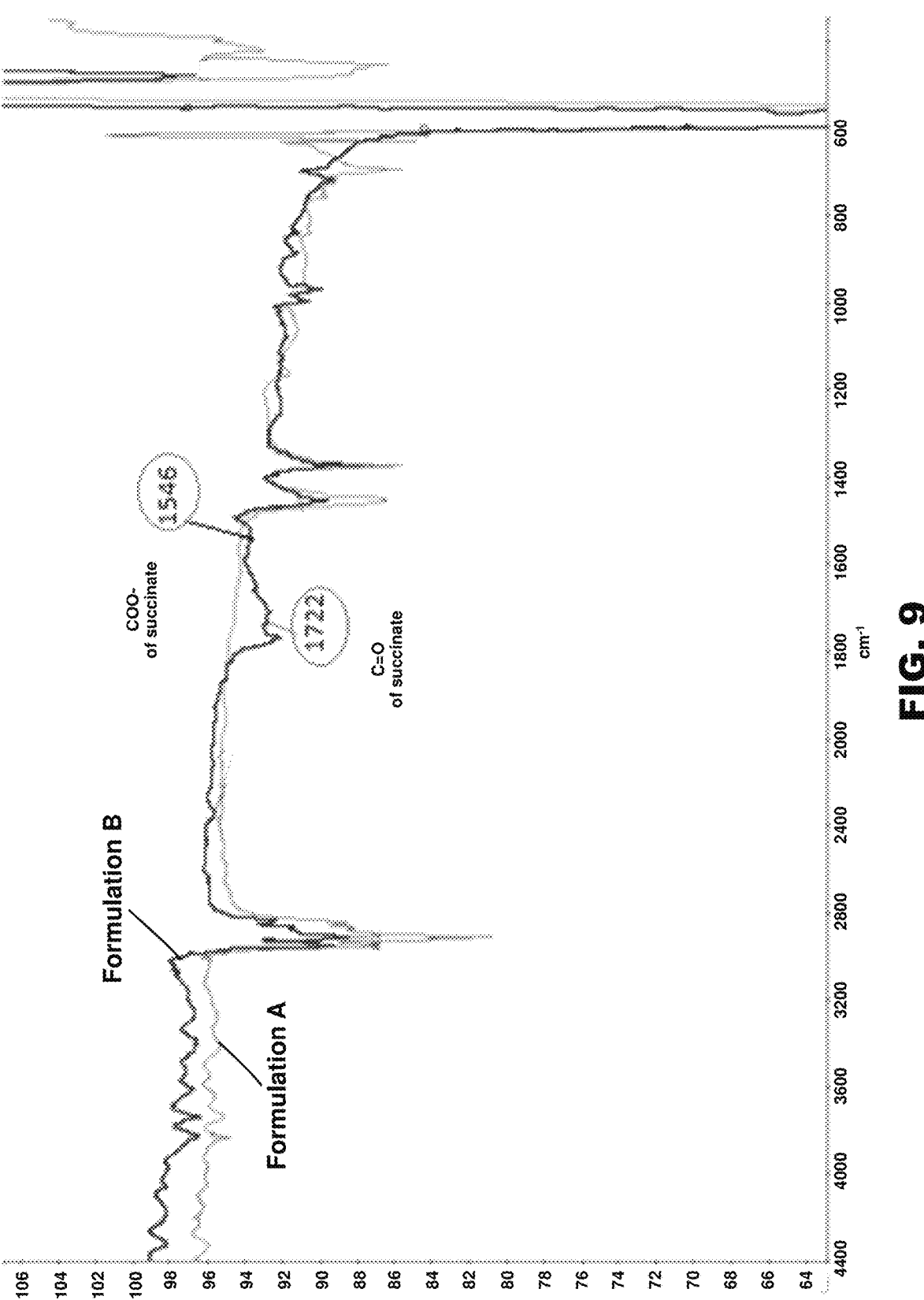
FIG. 9 is a Fourier Transform Infrared-Attenuated Total Reflectance spectra overlay of an unmaleated depolymerized polypropylene wax and a maleated depolymerized polypropylene wax.

FIG. 9 is a Fourier Transform Infrared-Attenuated Total Reflectance spectra overlay of Formulation A and Formulation B. The presence of characteristic peaks at 1722 cm (−1) and 1546 cm (−1) on the spectrum for Formulation B demonstrates the succinate chemical groups bound to polypropylene which proves successful maleation process.

Terms such as "about" should be understood to have the meanings one skilled in the art would apply to them given the context. In some embodiments, "about" can mean plus or minus five percent.

While particular elements, embodiments and applications of the present invention have been shown and described, it will be understood, that the invention is not limited thereto since modifications can be made without departing from the scope of the present disclosure, particularly in light of the foregoing teachings. For example, the numerous embodiments demonstrate that different combinations of components are possible within the scope of the claimed invention, and these described embodiments are demonstrative and other combinations of the same or similar components can be employed to achieve substantially the same result in substantially the same way. Further, all of the claims are hereby incorporated by reference into the description of the preferred embodiments.

What is claimed is:

1. A composition comprising:

a depolymerized polymer wherein said depolymerized polymer has been maleated, wherein said depolymerized polymer is derived from depolymerization of a polypropylene feedstock via a depolymerization process, wherein said polypropylene feedstock comprises recycled polypropylene, wherein said depolymerized polymer comprises greater than 0.25% olefin content on the backbone of the chain, wherein said depolymerized polymer has a weight-average molecular weight between and inclusive of 500-45,000 atomic mass units, wherein said depolymerized polymer has been maleated to an acid number greater than 1 mg KOH/g, wherein said composition further comprises greater than 25 ppm zinc.

2. The composition of claim 1, wherein said depolymerization process is at least partially thermal.

3. The composition of claim 1 wherein said depolymerization process is at least partially catalytic.

4. The composition of claim 1, wherein the polypropylene feedstock comprises a post-industrial derived recycled polypropylene or a post-consumer derived recycled polypropylene.

5. A composition comprising:

a depolymerized polymer wherein said depolymerized polymer has been maleated;

greater than 25 ppm iron;

greater than 25 ppm zinc; and greater than 50 ppm titanium, wherein said depolymerized polymer is derived from depolymerization of a polypropylene feedstock via a depolymerization process, wherein said polypropylene feedstock comprises recycled polypropylene, wherein said depolymerized polymer has a weight-average molecular weight between and inclusive of 500-45,000 atomic mass units, wherein said depolymerized polymer has been maleated to an acid number greater than 1 mg KOH/g.

6. The composition of claim 5, wherein said depolymerized polymer comprises greater than 0.25% olefin content on the backbone of the chain.

7. The composition of claim 5 wherein said depolymerization process is at least partially catalytic.

8. The composition of claim 5, wherein the polypropylene feedstock comprises post-industrial derived recycled polypropylene.

9. The composition of claim 5, wherein the polypropylene feedstock comprises post-consumer derived recycled polypropylene.

10. The composition of claim 5, wherein said polypropylene feedstock comprises greater than 5% of post-consumer derived recycled polypropylene.

11. The composition of claim 5, wherein said polypropylene feedstock comprises between 5% to 30% material that is other than polypropylene material based on the total weight of said polypropylene feedstock.

12. A composition comprising:

a depolymerized polymer wherein said depolymerized polymer has been maleated, wherein said depolymerized polymer is derived from depolymerization of a polypropylene feedstock via a depolymerization process, wherein said polypropylene feedstock comprises recycled polypropylene, wherein said depolymerized polymer comprises greater than 0.25% olefin content on the backbone of the chain, wherein said depolymerized polymer has a weight-average molecular weight between and inclusive of 500-45,000 atomic mass units, wherein said depolymerized polymer has been maleated to an acid number greater than 1 mg KOH/g, wherein said composition further comprises greater than 50 ppm titanium.

13. The composition of claim 12 wherein said depolymerization process is at least partially catalytic.

14. The composition of claim 12, wherein the polypropylene feedstock comprises a post-industrial derived recycled polypropylene or a post-consumer derived recycled polypropylene.

15. A composition comprising:

a depolymerized polymer wherein said depolymerized polymer has been maleated, wherein said depolymerized polymer is derived from depolymerization of a polypropylene feedstock via a depolymerization process, wherein said polypropylene feedstock comprises recycled polypropylene, wherein said depolymerized polymer comprises greater than 0.25% olefin content on the backbone of the chain, wherein said depolymerized polymer has a weight-average molecular weight between and inclusive of 500-45,000 atomic mass units, wherein said depolymerized polymer has been maleated to an acid number greater than 1 mg KOH/g, wherein said composition further comprises greater than 25 ppm iron.

16. The composition of claim 15 wherein said depolymerization process is at least partially catalytic.

17. The composition of claim 15, wherein the polypropylene feedstock comprises a post-industrial derived recycled polypropylene or a post-consumer derived recycled polypropylene.

18. A composition comprising:

a depolymerized polymer wherein said depolymerized polymer has been maleated, wherein said depolymerized polymer is derived from depolymerization of a polypropylene feedstock via a depolymerization process, wherein said polypropylene feedstock comprises recycled polypropylene, wherein said depolymerized polymer comprises greater than 0.25% olefin content on the backbone of the chain, wherein said depolymerized polymer has a weight-average molecular weight between and inclusive of 500-45,000 atomic mass units, wherein said depolymerized polymer has been maleated to an acid number greater than 1 mg KOH/g, wherein said depolymerized polymer comprises at least one grafted succinate group.

19. The composition of claim 18, wherein said depolymerization process is at least partially catalytic.

20. The composition of claim 18, wherein the polypropylene feedstock comprises a post-industrial derived recycled polypropylene or a post-consumer derived recycled polypropylene.

* * * * *